United States Patent
Chapa, Jr. et al.

(10) Patent No.: US 10,363,475 B2
(45) Date of Patent: Jul. 30, 2019

(54) ATHLETICISM RATING AND PERFORMANCE MEASURING SYSTEM

(71) Applicant: NIKE, Inc., Beaverton, OR (US)

(72) Inventors: Rodolfo Chapa, Jr., Portland, OR (US); Hamid G. Arjomand, Portland, OR (US); Adam C. Braun, Portland, OR (US); Andrew Bark, Palos Verdes, CA (US)

(73) Assignee: NIKE, Inc., Beaverton, OR (US)

( * ) Notice: Subject to any disclaimer, the term of this patent is extended or adjusted under 35 U.S.C. 154(b) by 279 days.

(21) Appl. No.: 15/448,837

(22) Filed: Mar. 3, 2017

(65) Prior Publication Data
US 2017/0173393 A1    Jun. 22, 2017

Related U.S. Application Data

(63) Continuation of application No. 14/611,503, filed on Feb. 2, 2015, now Pat. No. 9,623,316, which is a (Continued)

(51) Int. Cl.
*A63B 71/06* (2006.01)
*A63B 24/00* (2006.01)
(Continued)

(52) U.S. Cl.
CPC ...... *A63B 71/0619* (2013.01); *A63B 24/0006* (2013.01); *A63B 24/0062* (2013.01); (Continued)

(58) Field of Classification Search
CPC ............ A61B 2562/0219; A63B 71/06; A63B 24/0062
See application file for complete search history.

(56) References Cited

U.S. PATENT DOCUMENTS

| | | |
|---|---|---|
| 3,492,582 A | 1/1970 | Heywood |
| 4,186,388 A | 1/1980 | Robinson |

(Continued)

FOREIGN PATENT DOCUMENTS

| | | |
|---|---|---|
| FR | 2676369 A1 | 11/1992 |
| WO | 8805323 A1 | 7/1988 |

OTHER PUBLICATIONS

Peter J. Maud and Carl Foster. Physiological Assessment of Human Fitness. 1995. pp. 1-7, 37-54, 115-132, 167-187, 221-225. Human Kinetics, USA.

(Continued)

*Primary Examiner* — Reginald A Renwick
(74) *Attorney, Agent, or Firm* — Banner & Witcoff, Ltd.

(57) ABSTRACT

A universal athleticism rating system and related athletic performance measuring systems for accurately detecting and recording athletic performance are disclosed. The athleticism rating system evaluates individual athletes against a common, standardized, set of athletic performance tests. Each athlete performs the athletic tests and his or her scores in the individual tests are entered into a standardized calculation to produce a single athletic performance score. The related performance measuring system is preferably a timing system that ensures quick, easy, and accurate collection of athletic event timing related data without the need for the athlete to wear any special detection devices or the like. In a preferred embodiment, the performance measuring system integrates with the rating system to provide seamless athletic data collection and rating of athletes.

18 Claims, 18 Drawing Sheets

Related U.S. Application Data continuation of application No. 14/100,976, filed on Dec. 9, 2013, now Pat. No. 8,944,959, which is a continuation of application No. 13/168,731, filed on Jun. 24, 2011, now Pat. No. 8,602,946, which is a continuation of application No. 11/269,161, filed on Nov. 7, 2005, now Pat. No. 8,070,654.

(60) Provisional application No. 60/688,518, filed on Jun. 7, 2005, provisional application No. 60/625,482, filed on Nov. 5, 2004.

(51) Int. Cl.
    *G06F 1/16* (2006.01)
    *G07C 1/22* (2006.01)
    *A63B 71/02* (2006.01)
    *A63B 102/18* (2015.01)

(52) U.S. Cl.
    CPC .......... *A63B 71/06* (2013.01); *A63B 71/0616* (2013.01); *G06F 1/1626* (2013.01); *G07C 1/22* (2013.01); *A63B 2024/0009* (2013.01); *A63B 2024/0012* (2013.01); *A63B 2024/0065* (2013.01); *A63B 2024/0068* (2013.01); *A63B 2024/0071* (2013.01); *A63B 2071/026* (2013.01); *A63B 2071/0661* (2013.01); *A63B 2071/0663* (2013.01); *A63B 2102/18* (2015.10); *A63B 2220/12* (2013.01); *A63B 2220/13* (2013.01); *A63B 2220/805* (2013.01); *A63B 2225/093* (2013.01); *A63B 2225/15* (2013.01); *A63B 2225/20* (2013.01); *A63B 2225/50* (2013.01); *A63B 2243/007* (2013.01); *A63B 2243/0025* (2013.01); *A63B 2243/0037* (2013.01); *A63B 2243/0066* (2013.01)

(56) References Cited

U.S. PATENT DOCUMENTS

| | | | |
|---|---|---|---|
| 4,645,458 A | 2/1987 | Williams | |
| 4,752,764 A | 6/1988 | Peterson et al. | |
| 4,763,287 A | 8/1988 | Gerhaeuser et al. | |
| 4,823,367 A | 4/1989 | Kreutzfeld | |
| 5,031,903 A | 7/1991 | Clarke | |
| 5,469,470 A | 11/1995 | Takahashi | |
| 5,469,740 A | 11/1995 | French et al. | |
| 5,496,204 A | 3/1996 | Brown et al. | |
| 5,496,740 A | 3/1996 | Williams | |
| 5,511,045 A | 4/1996 | Sasaki et al. | |
| 5,697,791 A | 12/1997 | Nashner et al. | |
| 5,720,200 A | 2/1998 | Anderson et al. | |
| 5,812,049 A | 9/1998 | Uzi | |
| 5,890,997 A | 4/1999 | Roth | |
| 5,897,457 A | 4/1999 | Mackovjak | |
| 6,002,336 A | 12/1999 | Widding et al. | |
| 6,010,452 A | 1/2000 | Harcourt | |
| 6,073,489 A | 6/2000 | French et al. | |
| 6,086,379 A | 7/2000 | Pendergast et al. | |
| 6,155,957 A | 12/2000 | Worley et al. | |
| 6,181,647 B1 | 1/2001 | Tipton et al. | |
| 6,186,961 B1 | 2/2001 | Hanoun | |
| 6,308,565 B1 | 10/2001 | French et al. | |
| 6,430,997 B1 | 8/2002 | French et al. | |
| 6,568,449 B2 | 5/2003 | Owen et al. | |
| 6,585,622 B1 | 7/2003 | Shum et al. | |
| 6,607,483 B1 | 8/2003 | Holland | |
| 6,649,905 B2 | 11/2003 | Grenlund | |
| 6,746,310 B2 | 6/2004 | Tricard et al. | |
| 6,746,370 B1 | 6/2004 | Fleming et al. | |
| 6,765,726 B2 | 7/2004 | French et al. | |
| 6,885,971 B2 | 4/2005 | Vock et al. | |
| 6,902,513 B1* | 6/2005 | McClure | A63B 24/0006 482/4 |
| 6,917,565 B2 | 7/2005 | Kishida | |
| 7,072,789 B2 | 7/2006 | Vock et al. | |
| 7,278,966 B2 | 10/2007 | Hjelt et al. | |
| 7,480,512 B2 | 1/2009 | Graham et al. | |
| 7,946,960 B2 | 5/2011 | Vitolo et al. | |
| 8,109,858 B2 | 2/2012 | Redmann | |
| 2004/0006445 A1 | 1/2004 | Paek | |
| 2004/0225467 A1 | 11/2004 | Vock et al. | |
| 2004/0229729 A1 | 11/2004 | Albert et al. | |
| 2005/0014113 A1 | 1/2005 | Fleck et al. | |
| 2005/0069853 A1 | 3/2005 | Tyson et al. | |
| 2005/0080566 A1 | 4/2005 | Vock et al. | |
| 2005/0084850 A1 | 4/2005 | Cao et al. | |
| 2005/0167907 A1* | 8/2005 | Curkendall | A63B 24/0021 273/108 |
| 2005/0171410 A1 | 8/2005 | Hjelt et al. | |
| 2005/0227831 A1 | 10/2005 | Mills et al. | |
| 2005/0288154 A1 | 12/2005 | Lee et al. | |
| 2007/0213126 A1 | 9/2007 | Deutsch et al. | |
| 2007/0219059 A1 | 9/2007 | Schwartz et al. | |
| 2008/0261776 A1 | 10/2008 | Skiba | |
| 2009/0046893 A1 | 2/2009 | French et al. | |
| 2010/0017402 A1 | 1/2010 | Fleming et al. | |

OTHER PUBLICATIONS

Dennis K. Flood. Practical Math for Health Fitness Professionals. 1996. pp. 1-4. Human Kinetics, USA.

John Hawley and Lousie Burke. Peak Performance: Training and Nutritional Strategies for Sport. 1998. pp. 32-37, 50-76, 148-151. Allen & Unwin, Australia.

Vladimir M. Zatsiorsky. Science and Practice of Strength Training. 1995. pp. 200-221. Human Kinetics, USA.

Mel Cunningham Siff. Supertraining. 423-434. Supertraining Institute.

Australian Sports Commision. Physiological Tests for Elite Athletes. 2000. pp. 37-49, 224-237. Human Kinetics, USA.

American College of Sports Medicine. ACSM's Guidelines for Exercise Testing and Prescription. 1995. pp. 19-84, 110-148. Williams & Wilkins, USA.

Presidential Physical Fitness Award, [online], <URL: http://www.indiana.edu/~preschal>, Mar. 1, 2000 [retrieved on Oct. 23, 2008], Retrieved from the Internet Wayback Machine: <URL: http://web.archive.org/web/20000301151029/www.indiana.edu/~preschal/testitems.html> and <URL: http://webarchive.org/web/20000301100939/www.indiana.edu/~preschal/qualifying/presidential.html>.

Fitnessgram. [online], <URL: http://www.cooperinst.org>, Aug. 17, 2000 [retrieved on Oct. 27, 2008], Retrieved from the Internet Wayback Machine: <URL: http://web.archive.Org/web/20000817163237/http://www.cooperinst.org/5.html> and <URL: http://web.archive.org/web/20000901054651/www.cooperinst.org/fgram.html>.

Advanced Fitness Designs Inc. FITeval 2000 User's Guide. Jun. 2000. Advanced Fitness Designs Inc.

Fitnessgram. [online], <URL: http://www.americanfitness.net>, Aug. 16, 2000 [retrieved on Nov. 7, 2008], Retrieved from the Internet Wayback Machine: <URL: http://web.archive.org/web/20000816235846/www.americanfitness.net/Fitnessgram/>.

M. Yessis; "The Athlete Defined: A Soviet System of Rank"; Strength & Conditioning Journal, 3:4 pp. 20-1: 1981.

D. Pfaff; "Norm-based field testing."; New Studies in Athletics, 8:1 pp. 51-55: 1993.

S. Pilicz et al.; "Physical Fitness Score Tables of Polish Youth-Criteria for Measuring Aerobic Capacity By the Cooper Test"; Monograph; Warsaw; 2005.

R. Stupnicki et al.; "Standardisation of somatic and physical fitness variables"; Physical Education and Sport, 49, pp. 72-79; 2005.

T. Olds et al.; "Worldwide variation in the performance of children and adolescents: An analysis of 109 studies of the 20-m shuttle run test in 37 countries"; Journal of Sports Sciences, 24(10), pp. 1025-1038; Oct. 2006.

J.R. Mureika et al.; "The 1999 Mercier Scoring Tables: A How-To Guide"; Athletics: Canada's National Track and Field/Running Magazine; Apr./May 2000.

(56) References Cited

OTHER PUBLICATIONS

V. Trkal; "The Development of Combined Events Scoring Tables and Implications for the Training of Decathletes"; New Studies in Athletics, 18:4, pp. 7-14; 2003.
K. Stauffer; "The Comparison of the Max Jones Quadrathlon With the Vertical Jump and Ningate Cycle Tests As a Method to Assess Anaerobic Power in Female Division 1 College Basketball Players"; Doctoral Dissertation; University of Pittsburgh 2005.
W. Westera; "Decathlon: Towards a balanced and sustainable performance assessment method"; New Studies in Athletics, 21:1, pp. 39-51; 2006.
B. Grammaticos; "The physical basis of scoring the athletic performance"; New Studies in Athletics, 22:3 pp. 47-53; 2007.
International Search Report; PCT app. No. PCT/US05/40493; dated Jul. 13, 2006; 2 pages.
Written Opinion of the International Searching Authority; PCT app No. PCT/US05/40493; dated Jul. 13, 2006; 3 pages.
Extended European Search report from EP12190883.4 dated Feb. 4, 2013.
Extended European Search report from EP12190879.2 dated Feb. 4, 2013.

\* cited by examiner

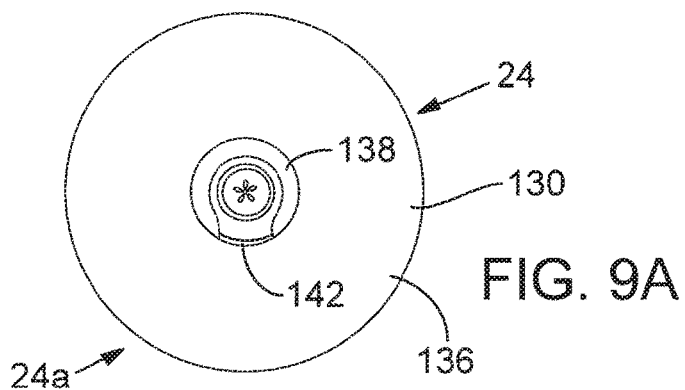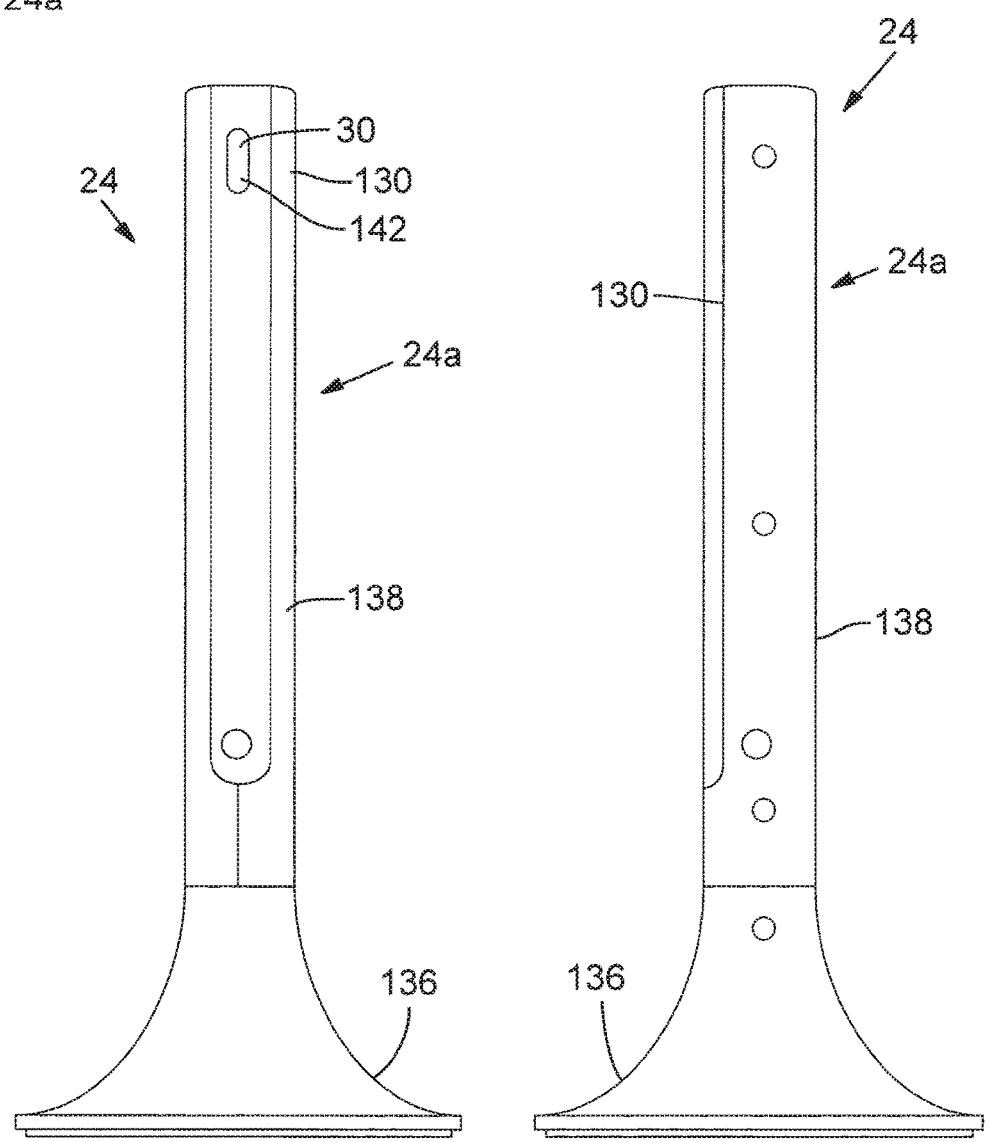
FIG. 9A
FIG. 9B    FIG. 9C

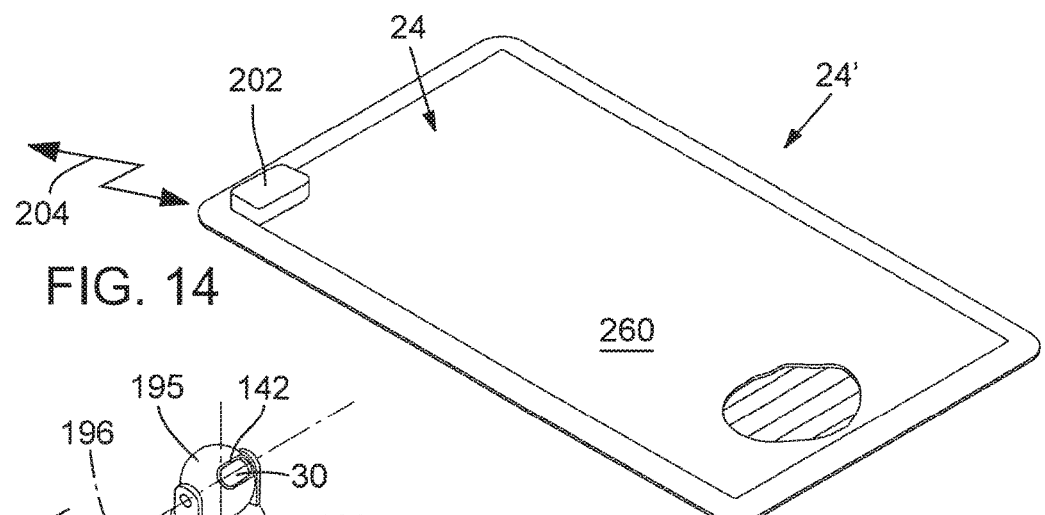
FIG. 14
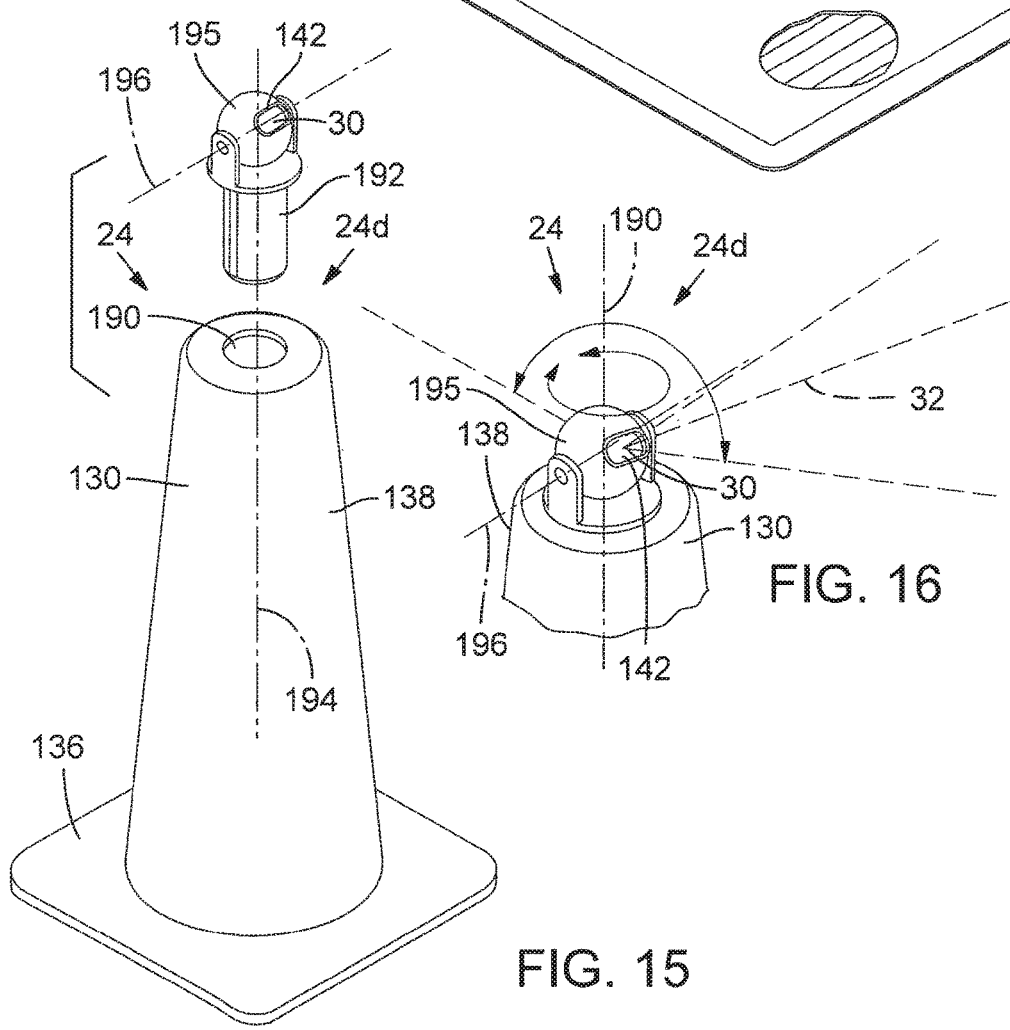
FIG. 15
FIG. 16

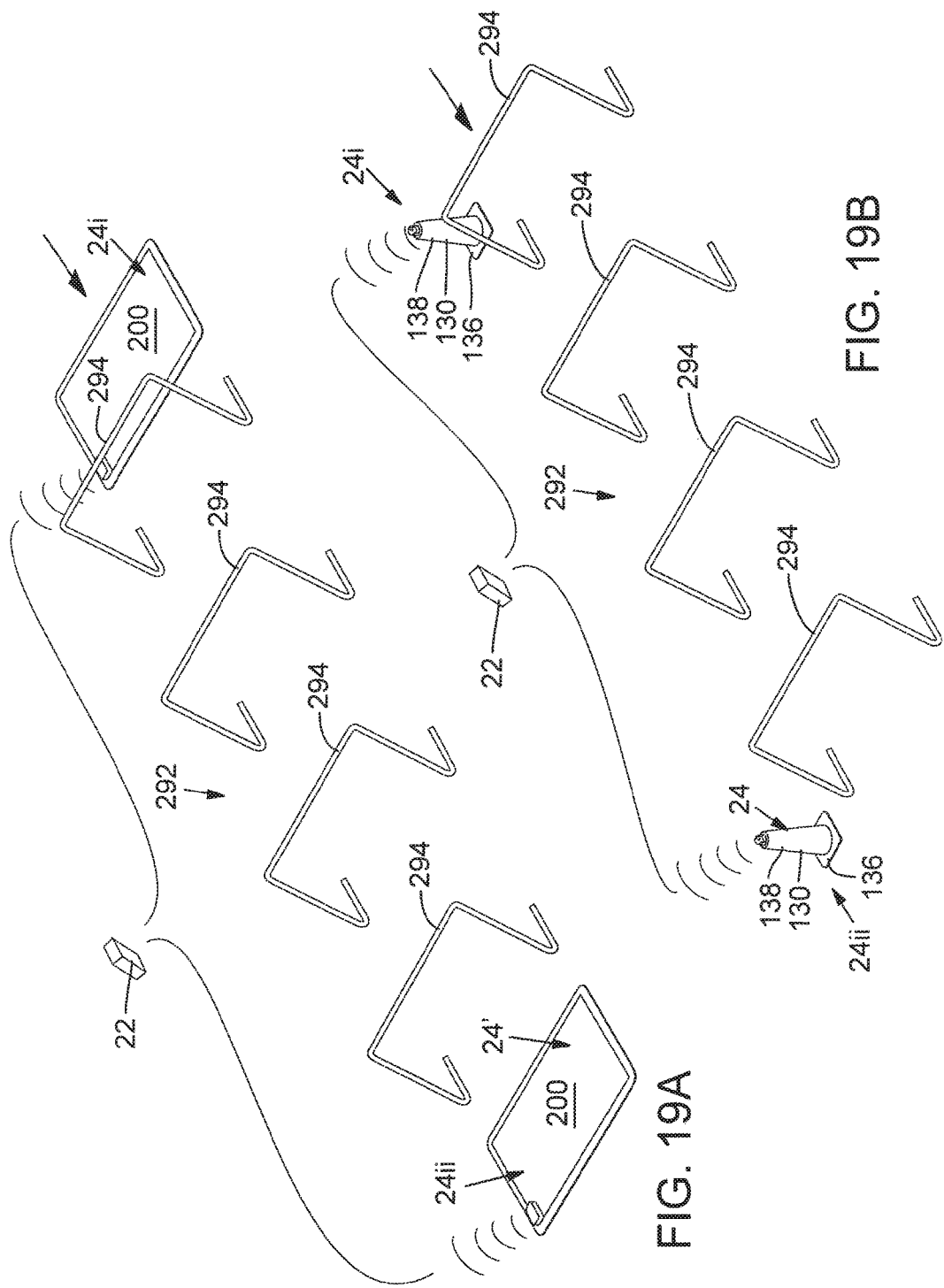

ATHLETICISM RATING AND PERFORMANCE MEASURING SYSTEM

CROSS-REFERENCE TO RELATED APPLICATIONS

This application is a continuation of and claims priority to U.S. patent application Ser. No. 14/611,503, filed Feb. 2, 2015, which is a continuation of U.S. patent application Ser. No. 14/100,976, filed Dec. 9, 2013, now U.S. Pat. No. 8,944,959, which is a continuation of U.S. patent application Ser. No. 13/168,731, filed Jun. 24, 2011, now U.S. Pat. No. 8,602,946, which is a continuation of U.S. patent application Ser. No. 11/269,161, filed on Nov. 7, 2005, now U.S. Pat. No. 8,070,654, which claims priority to U.S. Provisional Patent Application Ser. No. 60/625,482 filed on Nov. 5, 2004, and U.S. Provisional Patent Application Ser. No. 60/688,518 filed on Jun. 7, 2005. This application is also related to U.S. patent application Ser. No. 13/650,884, filed Oct. 12, 2012, now U.S. Pat. No. 8,845,495, U.S. patent application Ser. No. 13/284,645, filed Oct. 28, 2011, now U.S. Pat. No. 8,287,435, U.S. patent application Ser. No. 13/168,652, filed Jun. 24, 2011, now U.S. Pat. No. 8,292,788, all of which are continuations of U.S. patent application Ser. No. 11/269,161. This application is also related to U.S. patent application Ser. No. 12/718,854 filed on Mar. 5, 2010, now U.S. Pat. No. 8,083,646, which is a divisional of U.S. patent application Ser. No. 11/269,161. The disclosures of all of these applications are hereby incorporated by reference in their entirety for any and all purposes.

FIELD OF THE INVENTION

The present invention relates to athleticism rating and related performance measuring systems for use primarily with athletic activities such as training and evaluating athletes and the like.

BACKGROUND OF THE INVENTION

Athletics are extremely important in our society. In addition to competing against each other on the field, athletes often compete with each other off the field. For example, student athletes routinely compete with each other for a spot on the team, or even if they are already on the team, for more "game time" or a higher starting position. Graduating high school seniors are also in competition with other student athletes for coveted college athletic scholarships and the like. Also, amateur athletes in some sports often compete with each other for jobs as professional athletes in that sport. The critical factor in all of these competitions is the athletic performance, or athleticism, of the particular athlete, and the ability of that athlete to demonstrate or document those abilities to others.

Speed, agility, reaction time, and power are some of the determining characteristics influencing the athleticism of an athlete. Accordingly, athletes strive to improve their athletic performance in these areas, and coaches and recruiters tend to seek those athletes that have the best set of these characteristics for the particular sport.

To date, this evaluation and comparison of athletes has been largely subjective. Scouts tour the country viewing potential athletes for particular teams, and many top athletes are recruited site unseen, simply by word of mouth: These methods for evaluating and recruiting athletes are usually hit or miss.

One method for evaluating and comparing athletes' athleticism involves having the athletes perform a common set of exercises and drills. Athletes that perform the exercises or drills more quickly and/or more accurately are usually considered to be better than those with slower or less accurate performance for the same exercise or drill. For example, "cone drills" are routinely used in training and evaluating athletes. In a typical "cone drill" the athlete must follow a predetermined course between several marker cones and, in the process, execute a number of rapid direction changes, and/or switch from forward to backward or lateral running.

Although widely used in a large number of institutions, high schools, colleges, training camps, and amateur and professional teams, such training and testing drills usually rely on the subjective evaluation of the coach or trainer or on timing devices manually triggered by a human operator. Accordingly, they are subject to human perception and the error inherent in it. These variances and errors in human perception can lead to the best athlete not being determined and rewarded.

Moreover, efforts to meaningfully compile and evaluate the timing and other information gathered from these exercises and drills have been limited. For example, while the fastest athlete from a group of athletes through a given drill may be determinable, these known systems do not allow that athlete to be meaningfully compared to athletes from all over the world that may not have participated in the exact same drill on the exact same day.

Automated sensing and start/stop devices are used in some specific sports and competitions such as track and field and other track-based races, such as motorcycle, skiing, and horse races. These devices are usually expensive and complex, making them difficult to set-up, calibrate, and operate effectively. Accordingly, these devices are usually permanently installed at a particular facility. These facilities are often not regularly accessible to athletes for routine training purposes. Moreover, the data compiled by these devices is often not meaningfully compiled and accessible for athlete evaluation and comparison purposes.

SUMMARY OF THE INVENTION

Accordingly, despite the available athlete training and evaluation methods and the related known performance measuring systems, there remains a need for a universal athleticism rating system and related athletic performance measuring systems for accurately detecting and recording athletic performance. Among other benefits disclosed herein, the present invention fulfills these needs.

In a disclosed embodiment, an athleticism rating system evaluates individual athletes against a common, standardized, set of athletic performance tests. In general, each athlete performs the athletic tests and his or her scores in the individual tests are entered into a standardized calculation to produce a single athletic performance score. This score is then compared to the athletic performance scores of others who also completed the tests, thereby providing an objective rating of athletic performance between competing athletes.

The related performance measuring system is preferably a timing system that ensures quick, easy, and accurate collection of athletic event timing related data without the need for the athlete to wear any special detection devices or the like.

In another disclosed embodiment, the performance measuring system integrates with the rating system to provide seamless athletic data collection and rating of athletes.

BRIEF DESCRIPTION OF THE DRAWINGS

FIG. 9A is a top view a first preferred sensor unit in accordance with an embodiment of the present invention.

FIG. 9B is a front view of the sensor unit of FIG. 9A.

FIG. 9C is a left, side view of the sensor unit of FIG. 9A.

FIG. 14 is an isometric view of a third preferred sensor unit of FIG. 1 in accordance with an embodiment of the present invention.

FIG. 15 is an exploded, isometric view of a fourth preferred sensor unit of FIG. 1 in accordance with an embodiment of the present invention.

FIG. 16 is an enlarged, isometric view of the top portion of the fourth preferred sensor unit of FIG. 15 showing possible movement of the sensor.

FIG. 19A is an isometric view of a fifth exemplar training drill using the athleticism performance measuring system of FIG. 1 showing use of two sensor units of FIG. 14 in communication with a base unit.

FIG. 19B is an isometric view of a sixth exemplar training drill using the athleticism performance measuring system of FIG. 1 showing use of two sensor units of FIG. 14 in communication with a base unit.

DETAILED DESCRIPTION

Figure 1:
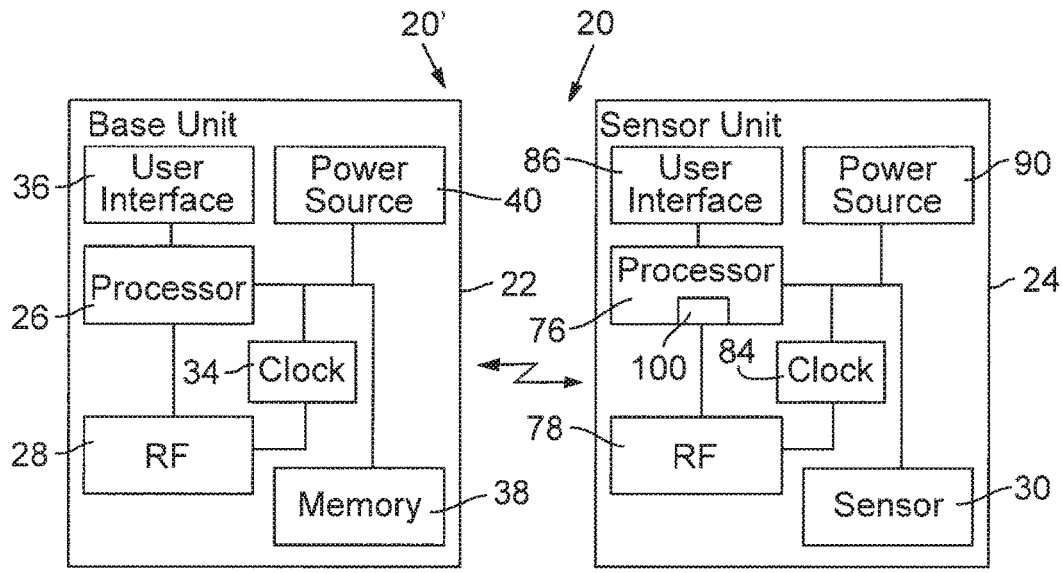
FIG. 1 is a schematic block diagram of an exemplar base unit and sensor unit of an athleticism performance measuring system in accordance with an embodiment of the present invention.

An athleticism rating system and related athletic performance measuring systems 20 are described herein and disclosed in FIGS. 1-19B. The athleticism rating system evaluates individual athletes against a common, standardized, set of athletic performance tests. The related performance measuring system 20 is preferably a timing system 20' that ensures quick, easy, and accurate collection of athletic event timing related data. In one disclosed embodiment, the performance measuring system 20 integrates with the rating system to provide seamless athletic data collection and rating of athletes. Each of these aspects of the invention are discussed in greater detail below:

A. Athleticism Rating System

One aspect of the present invention is an athleticism rating system that evaluates individual athletes against a common, standardized, set of athletic performance tests. In general, each athlete performs the athletic tests and his or her scores in the individual tests are entered into a standardized calculation to produce a single athletic performance score. This score is then compared to the athletic performance scores of others who also completed the tests, thereby providing an objective rating of athletic performance between competing athletes.

In a preferred embodiment, these athletic performance tests cover a range of athletic skills that are weighted in a predetermined proportion so as to be rationally related to the skills needed for a particular sport. For example, in American Football, strength, speed, and agility are all important. Accordingly, a desirable standardized athletic score should include the results from athletic tests in all these areas. Suitable common athletic tests that evaluative these characteristics include, but are not limited to, the 40-yard dash, the 20-yard shuttle, the vertical jump and the bench press. The details of performing each of these tests are well known in the art.

A primary benefit of this aspect of the invention is achieved by combining these test results into a normalizing equation to form a universal athleticism rating for an athlete. Exemplar desirable normalizing equations for particular sports are provided in mathematical equation format below:

$$\text{Athletic Rating(Football)} = (\text{Vertical Jump in inches}) \times (\text{No. Reps Bench Press at 185 pounds})((40 \text{ yd dash in seconds})+(20 \text{ yard shuttle in seconds})-2) \qquad \text{\#\#EQU00001\#\#}$$

$$\text{Athletic Rating(Baseball)} = (\text{Vertical Jump in inches}) \times (\text{No. Reps Bench Press at 185 pounds})(((30 \text{ yd dash in seconds})+(20 \text{ yard shuttle in seconds}))-1) \qquad \text{\#\#EQU00001.2\#\#}$$

Alternatively, the normalizing equation can take the form of a table of ratings, and the rating for a particular athlete can be determined by using the test results to look-up the athlete's rating in the table.

The athleticism rating offers several benefits. For example, it allows coaches, trainers, athletes, fans, print media, on-air television, recruiters, sports teams, scouts, parents, schools, sports institutions, manufacturers, sponsors, medical/physical therapists, researchers and the like to assess a player's athletic potential and performance against a standard rating system. This score can be used as a factor to assist in determining which athletes will be awarded athletic scholarships, picked for a team, and/or awarded endorsement contracts. In addition, the athleticism rating can help determine whether an injured player has returned to an acceptable level of fitness to return to play. Moreover, individual player athleticism ratings can help coaches on game-day by assisting a coach with selecting the best players to start the game and those with who are best suited for a particular task arising during a game.

The athleticism rating also serves as a motivational tool to the individual athlete. For example, the athlete can focus training toward improving their quantifiable athleticism rating thereby providing positive feedback to the athlete as their score improves. Similarly, an athlete can use his or her score to compare themselves to others in their athletic field, such as the athleticism rating of a celebrity professional athlete or the like.

The Athleticism Rating can be adapted to different sports such as Football, Baseball, Soccer, Track & Field, and Basketball by adjusting the test types and calculation used to derive the rating. Therefore a series of Athleticism Rating such as Athleticism Football Rating, Athleticism Baseball Rating can be developed.

As a universal athleticism rating for a given sport is widely accepted as a common standard, training can focus on an athlete striving to improve his or her athleticism rating score. Accordingly, training programs and related training products can be fine tuned to optimize an athlete's athleticism rating score. Such training products can include training plans, instructional videos such as DVD's, video games, and magazine content all aimed at teaching and using a revised training methodology to increase athleticism rating performance.

B. Performance Measuring Systems

Because the value of the above-described athleticism rating score necessarily depends on accurate athletic performance data collection, it is desirable to minimize human error in the data collection process. Accordingly, one or more sets of data used in the calculation of the athleticism rating are preferably collected by automatic means such as an automated performance measuring system 20. One such system is preferably an automated digital timing measurement device 20'. Such devices preferably automatically measure and record the results from a particular test and seamlessly integrate the collected data with the rating system to allow automatic performance rating results to be displayed. Of course, such performance measuring systems 20, such as automatic timing devices 20', can also be used as stand alone devices to collect and display athletic performance data of an athlete without necessarily integrating with a particular rating system.

Exemplar performance measuring systems 20 are disclosed in FIGS. 1-19A. Preferably, the performance measuring system 20 is an automatic timing device 20'. More preferably, the automatic timing device 20' is self-contained, lightweight, portable, and does not require the athlete to wear any special gear to allow the timing device to operate effectively. Such a device 20' is shown schematically in FIG. 1.

Referring to FIG. 1 and in general, the timing device 20' preferably has a base unit 22 and at least one portable sensor unit 24 that communicates with the base unit 22 either wirelessly or through a wired connection. When the timing system 20' is operating, the base unit 22 in the system is in communication with the one or more sensor units 24 in the system. The sensor units 24 then track timing and/or performance information about the performance of an athlete in a particular training activity. This information is communicated to the base unit 22 where it is processed to provide an assessment of an athlete's performance. In the simplest case, a sensor 30 in the sensor unit 24 is triggered when an athlete passes by a sensor field 32 (FIGS. 3A, 4A, 7B, 13C, 16) of the sensor 30. This timing information is then processed by the base unit 22 and used to measure the athlete's performance in the activity. As explained in greater detail later in this disclosure, several training and testing scenarios are possible using this basic equipment, including the use of multiple sensor units 24 and/or processing of intermediate triggers of the same sensor unit 24 such as with a shuttle run drill and the like.

For purposes of clarity, the components shown in FIG. 1 are divided by logical function. Of course, multiple functionalities may be handled by a single physical device. For example, the RF processing and processor elements may be grouped inside a single integrated circuit.

1. Detailed Discussion of Exemplar Base Unit Components

Referring to FIG. 1, the preferred components of an exemplar base unit 2 are a processor 26, radio frequency components 28 (also referred to as "RF components" herein), a clock 34, a user interface 36, memory 38, and a power source 40 that are all operably secured together to perform the described functions of the base unit.

The processor 26 organizes all the data communications, user interface operations, system management, and system timing functions. Preferably, the processor 26 is a programmable microprocessor, although other possible implementations are also possible.

Preferably, RF components 28 handle the processing required to send and receive information across the RF link to the sensor unit(s) 24. Depending on the specific RF hardware employed, some of the RF functionality may be handled by the processor 26. Of course, other forms of communication such as serial ports, USB, Bluetooth, WiFi, or another type of common communication transports could be used.

The system clock 34 serves at least two primary device functions. First, it provides an accurate time base for the system timing functions, and second, it provides an accurate time basis from which the RF components 28 operate. It is possible that two different clock rates could be needed in some applications. Preferably, in order to minimize the system code, a single clock source is used for both device functions. The clock information may also be used to control other system components such as timing for display drivers and the like.

Preferably, the base unit 22 includes a user interface 36 to allow a user to control and interact with the system. The user interface 36 is operable by the user through device input controls, such as buttons 50 (FIGS. 8A, 11A, and 12A-12C) and switches (not shown) and viewable to the user through the output display 52 (FIGS. 8A, 11A, and 12A-12C). The output display 52 is preferably segmented or a dot matrix LED or LCD display. Other possible display devices could be used as well. The output display is preferably used to show the performance data being measured as well as provide feedback to the user to allow the settings for the device to be modified. Additionally, other display elements, such as labeled LED outputs, could be used to indicate information to the user (i.e. the system is running, a sensor was triggered, etc.).

In an alternative base unit embodiment (not shown), the base unit has little or no user interface. Instead, the base unit is in a wired or wireless communication interface with a host system. Such communication interfaces could include serial ports, USB, Bluetooth, WiFi, or another type of common communication transports. This host system could take many forms including a PC, a PDA, a cell phone, or a custom designed unit. The host unit would then control the base unit in order to interact with the system. This method localizes the timing and sensor communications to a single unit and relieves the host system of the timing requirement accuracy and proprietary wireless capability.

In order to function, the base unit 22 accesses different memories within the system memory 38. These include code memories to store processing instructions and data memories to contain operating data. Additionally, the base unit 22 preferably has additional memory for non-volatile storage of data. This non-volatile storage data preferably includes setting information for the base unit and sensor units (RF parameters, sensor blanking times, etc.) as well as history information about measured performance, such as best times for specific drills and the like.

These memories can be implemented using many different technologies that will vary based on the architecture of the processor device. Some of the different memories may be physically part of the processor device.

Figure 11A:
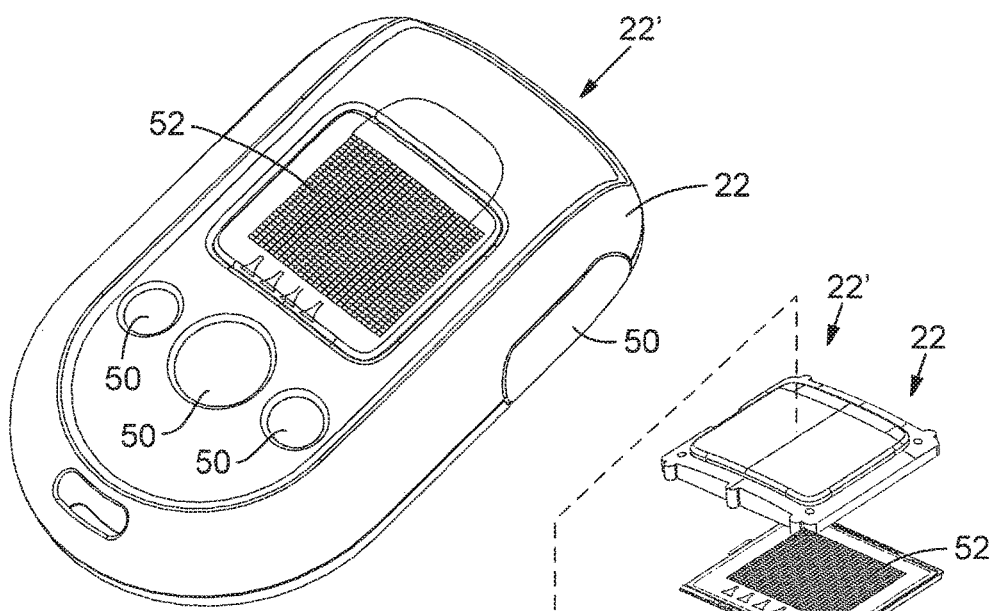
FIG. 11A is an isometric view of a first preferred base unit of FIG. 1.
Figure 11B:
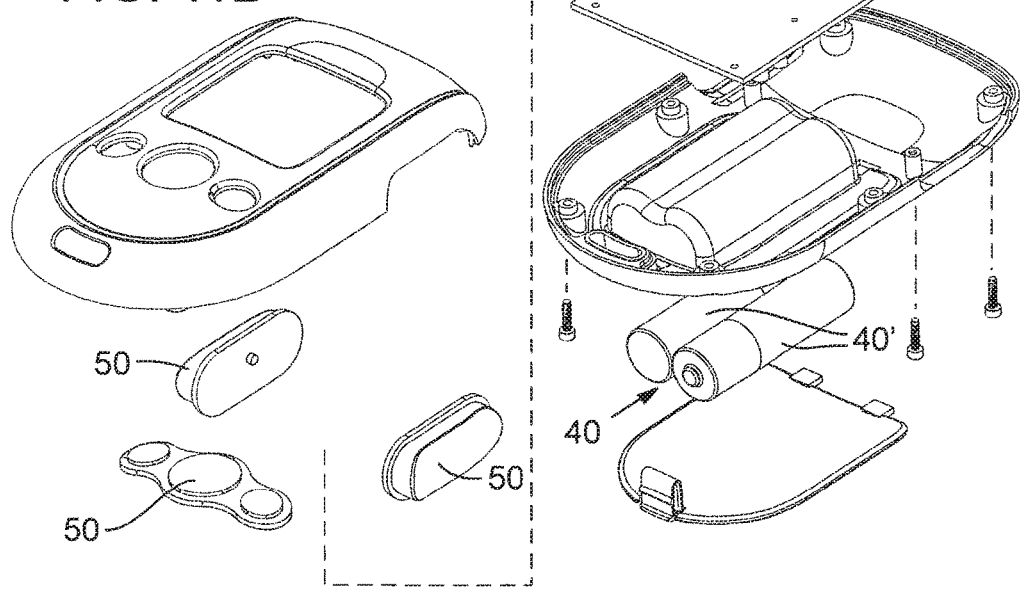
FIG. 11B is an enlarged, exploded view of the base unit of FIG. 11A.
Figure 12A:
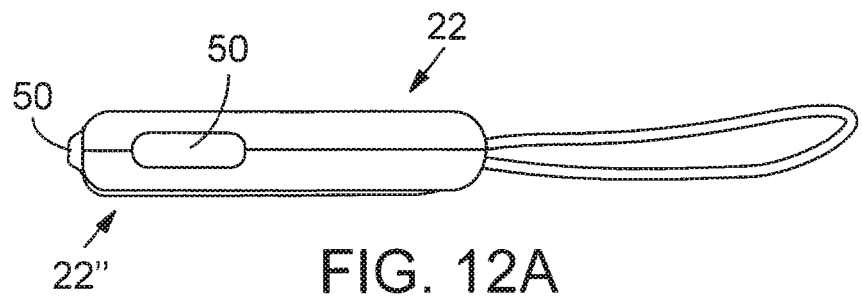
FIG. 12A is a side view of an alternative preferred base unit of FIG. 1.
Figure 12B:
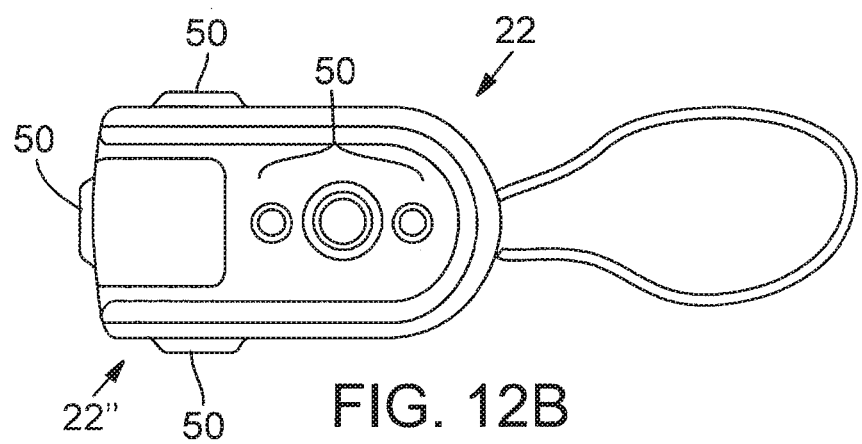
FIG. 12B is a top view of the alternative preferred base unit of FIG. 12A.
Figure 12C:
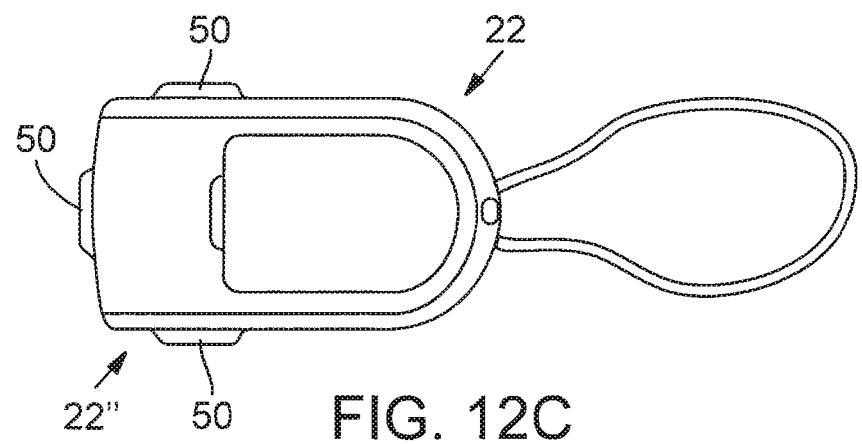
FIG. 12C is a bottom view of the alternative preferred base unit of FIG. 12A.

Preferably, the base unit 22 includes an internal power source 40. More preferably, this power source 40 is an internally mounted and easily replaceable battery 40' (FIG. 11B). Alternatively, power could be supplied though an auxiliary source such as an AC connected power supply or the like. If the base unit 22 is connected to a host system, such power can also be provided by the host system.

Figure 6A:
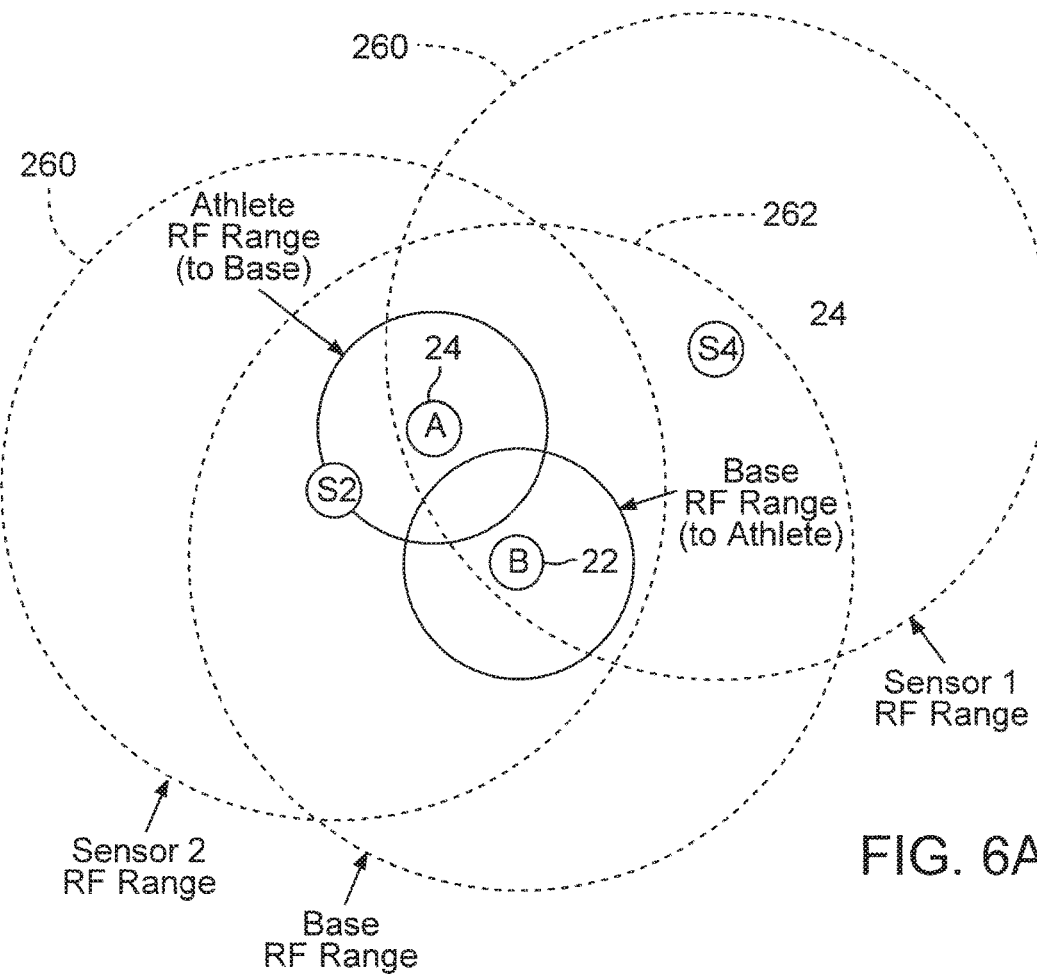
FIG. 6A is a top view of a possible orientation between a plurality of sensor units relative to a base unit in accordance with an embodiment of the present invention.
Figure 6B:
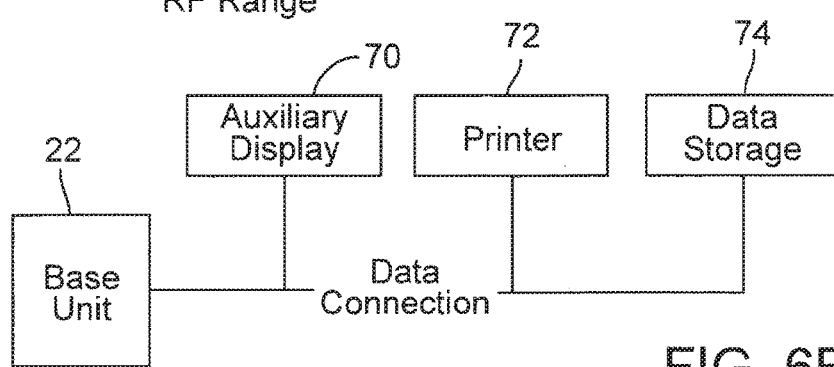
FIG. 6B is a schematic view of a base unit of FIG. 1 connected to possible peripherals such as an auxiliary display, printer and/or data storage device in accordance with an embodiment of the present invention.

If desired and referring to FIG. 6B, the base unit 22 can be operably connected to an auxiliary display 70, printer 72, and/or data storage device 74 to further facilitate use and dissemination of the collected data.

2. Detailed Discussion of Exemplar Sensor Unit Components

Referring to FIG. 1, the preferred components of an exemplar sensor unit 24 are a sensor processor 76, a sensor 30, radio frequency components 78, a clock input source 84, a user interface 86, memory 98, a power source 80, and a sensor triggering detection system 100, which is preferably integrated within the processor 76, that are all operably secured together to perform the described functions of the sensor unit 24.

The sensor processor 76 handles processing the sensor data, communicating with the base unit 22, and power management tasks for the sensor unit 24. Preferably the sensor processor 76 is a programmable microcontroller or microprocessor, but may be implemented with other hardware as well.

A wide variety of possible sensors 30 could be used. These include various types of proximity detection and motion detection devices. In one preferred embodiment, the sensor 30 is an optical proximity detection device that provides an analog voltage level to indicate the range of the closest object in its field of view.

More preferably, this optical device is single-sided, which means that no device (either a reflector or the optical emitter) is required on the opposite side of where the user will pass. The biggest benefit of this approach is that it allows great flexibility and robustness in the placement of the sensor unit 24 as it eliminates issues related to initial alignment and maintaining the alignment of these two components. A single-sided optical device that has been found to work particularly well as a sensor 30 in a sensor unit 24 is manufactured and sold by the Sharp Microelectronics of the Americas company based in Camas, Wash., USA, as model number GP2Y0A02YK. This optical device provides an analog output voltage proportional to the distance an object is located in front of the sensor.

For the preferred described distance sensor 30, the data is preferably processed using a simple threshold trigger. In other words, when an object is detected in the sensor field 32 (FIGS. 3A, 4A, 7B, 13C, 16) of the sensor 30 as being within a predetermined distance from the sensor 30, a timing algorithm is activated and/or stopped. Accordingly, an athlete can activate the timing features of the present system simply by passing by the sensor unit without any need for the athlete to wear any special reflective gear or the need to set-up any reflectors or the like on-site.

Acceptable alternative sensors include ultrasonic range finders, CCD or CMOS image sensors (either linear or two dimensional), and the like. Another alternative is to sense motion or detect athlete contact with a structure, such as a mat surface or the like. For all of these different sensors, there are many different methods the sensor data can be analyzed. For example, an imaging sensor would require image-processing algorithms to analyze the incoming data.

The RF components 78 of the sensor unit 24 enable it to communicate data with the base unit 22. As with the base unit 22, some of the RF functionality requirements could be handled by the sensor processor 76. Similarly, if a different communication protocol were used in the base unit 22, the sensor unit 24 could be similarly equipped with suitable engaging components of the different communication protocol.

The sensor unit 24 preferably has a clock input source 84. The clock input source 84 is used for several functions in the device including radio frequency interfacing as well as the timing for the sensor input.

Since the base unit 22 preferably handles the primary interaction with the sensor unit(s) 24, the user interface for the sensor unit 24 is preferably fairly minimal. Preferably, the sensor unit 24 has a simple a power switch 110 (FIGS. 10C and 10D) or button to turn the sensor unit on and off, and, if desired, a transducer (not shown), such as an LED or the like, to indicate whether the sensor unit is on or off. Alternatively, the sensor unit 24 can include additional interaction functionality such as additional transducers to indicate additional features of the system such as whether the sensor unit is properly communicating with the base unit 22 and the like.

Figures 10A, 10B, 10C:
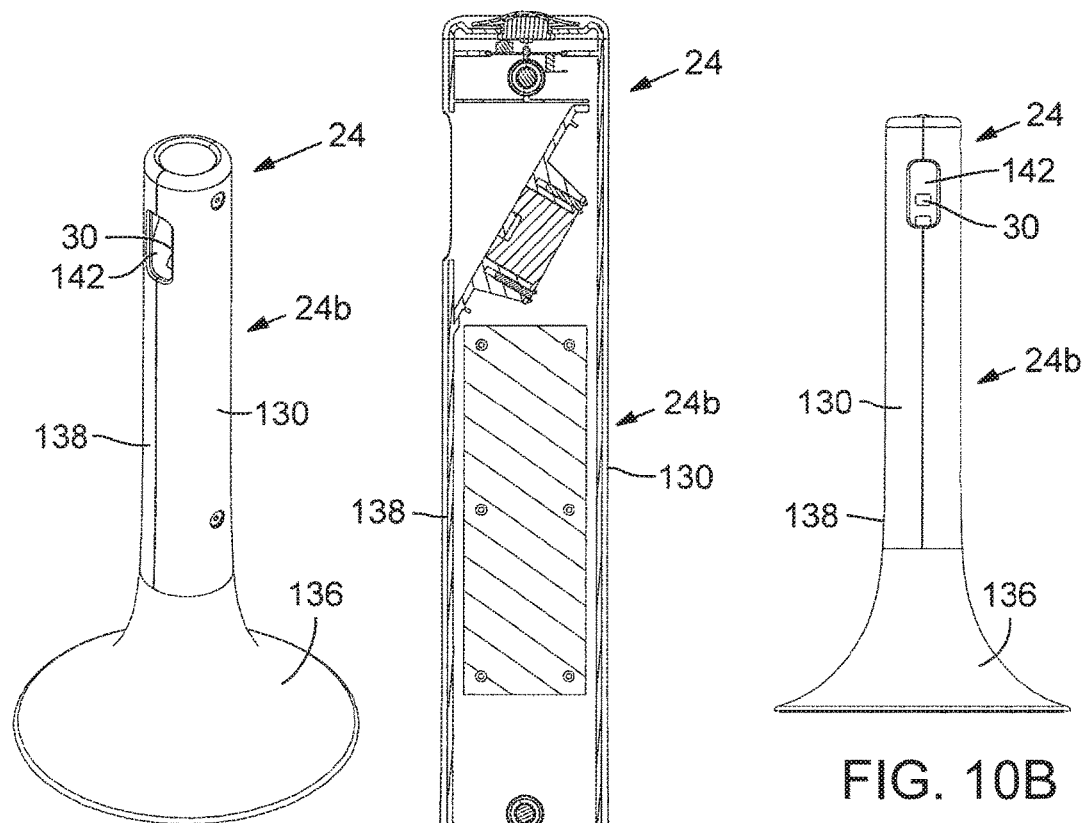
FIG. 10A is an isometric view of a second preferred sensor unit in accordance with an embodiment of the present invention.
FIG. 10B is a front view of the sensor unit of FIG. 10A.
FIG. 10C is a cross-sectional view of the sensor unit of FIG. 10A, taken along line 10C-10C of FIG. 10B.
Figure 10D:
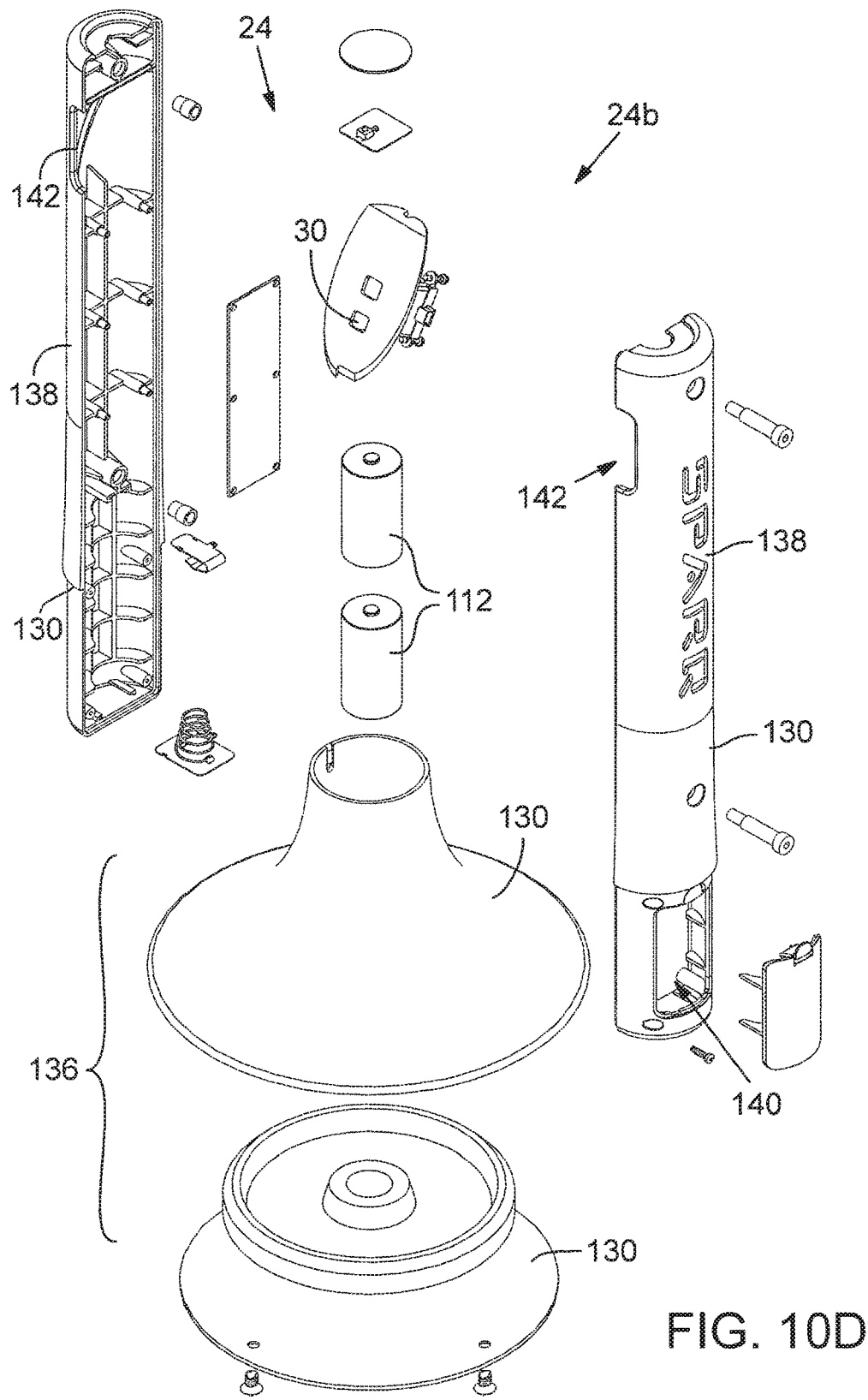
FIG. 10D is an enlarged, exploded view of the sensor unit of FIG. 10A.

Preferably, the sensor unit 22 is powered using an internally mounted battery 112 (FIGS. 10C and 10D). Alternatively, an AC connected supply can be. used, but such a connection would limit the portability to the sensor unit 24 to only be used near a power outlet or the like.

In cases where distance sensors 30 are used, it is preferable to shield the sensor so as to prevent spurious light from auxiliary sources, such as the sun or other reflections, from triggering the sensor. Regardless of which sensor and method is used, the final result is a time that indicates when the user enters or leaves the presence of a particular sensor field 32 (FIGS. 3A, 4A, 7B, 13C, 16) of the sensor 30. For some sensors, the sensing device may only be able to determine changes between active and inactive states of the sensor. In other words, where the user is detected, the sensor is in an active state, and when no user is detected the sensor is in an inactive state.

3. Sensor Unit Embodiments

Referring to FIGS. 9A-10E, 15 and 16, a variety of possible sensor units are disclosed. A first preferred sensor unit 24a is disclosed in FIGS. 9A-9C. A second preferred sensor unit 24b is disclosed in FIGS. 10A-10D, a third preferred sensor unit 24c is disclosed in FIG. 10E, and a fourth preferred sensor unit 24d is disclosed in FIGS. 15 and 16.

In order to avoid undue repetition, like elements between these embodiments are like numbered. In general, the previously described components of the sensor unit are preferably assembled into a portable frame 130 that preferably rests on a substantially horizontal surface such as the ground. Accordingly, the sensor 30 is preferably positioned above the substantially horizontal surface 132 (FIG. 13C) by a defined distance 134 (FIG. 13C). More preferably, the frame 130 includes a weighted base portion 136 and a tower portion 138 operably secured to the base portion. Even more preferably, the tower portion 138 is detachably secured to the base portion 136 to assist with portability of the sensor unit 24.

The frame 130 includes an easily accessible opening 140 (FIG. 10D) for receiving and changing batteries 112 and a sensor opening 142 in which the sensor field 32 is directed therethrough. The sensor 30 is mounted and positioned within the tower portion 138 so as to be directed through the opening. Preferably, the sensor 30 is recessed within the opening so as to shield the sensor 30 from inadvertent light such as sunlight and the like.

Figure 13A:
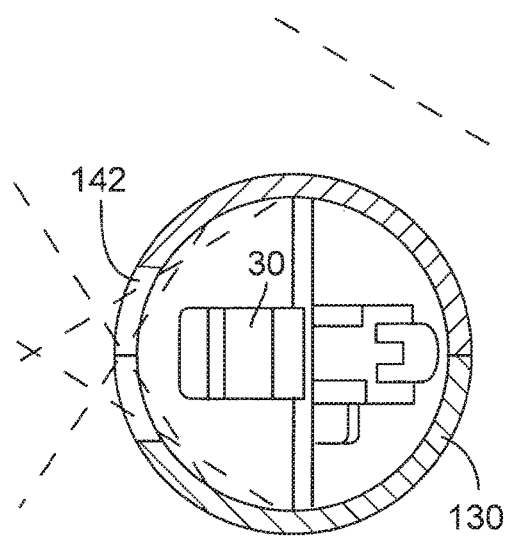
FIG. 13A is a cross-sectional view of the second preferred sensor unit of FIG. 10A taken along line 13A-13A of FIG. 10B.

Referring to FIG. 13A, the tower portion 138 of this embodiment preferably has a circular cross-section and the sensor 30 is substantially centered within the circular cross section as shown. Accordingly, inadvertent light rays (shown as broken lines in FIG. 13A) end to be reflected around the sensor 30 without interfering with the sensor 30 itself.

Figure 13B:
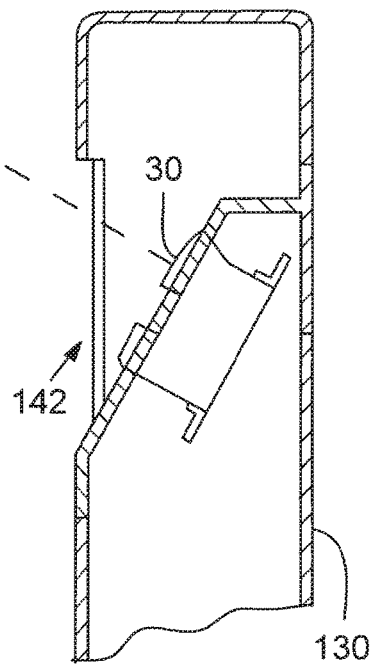
FIG. 13B is an enlarged, cross-sectional view of the second preferred sensor unit of FIG. 10A taken along line 13B-13B of FIG. 10B.
Figure 13C:
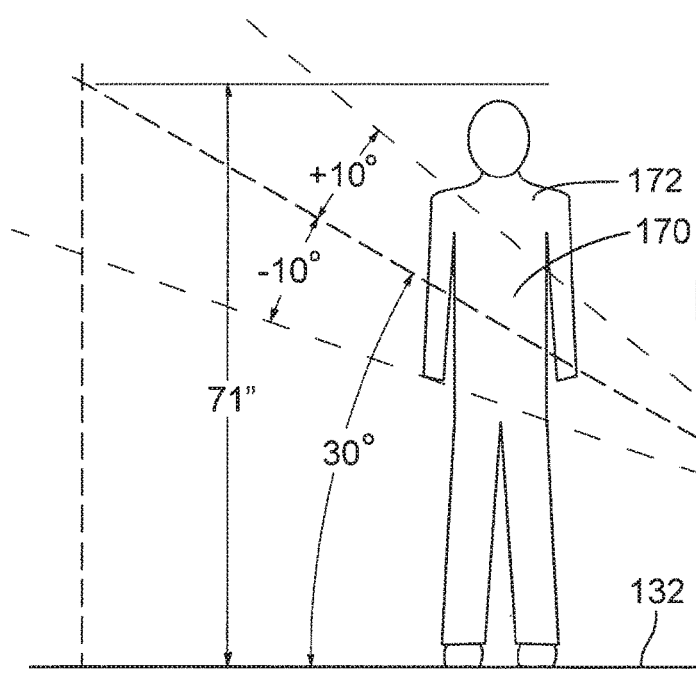
FIG. 13C is a side view of the second preferred sensor unit of FIG. 10A showing a possible preferred orientation of a sensor field generated by the sensor unit relative to an athlete.
Figure 13C:
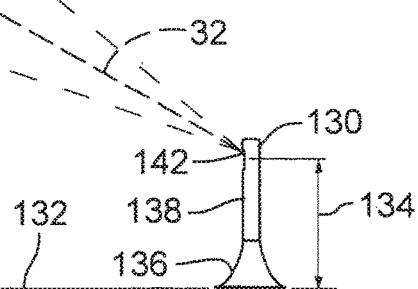

Referring to FIGS. 13B & 13C, in cases where the sensor unit 24 is used to time running-related athletic events, particular success has been had with the sensor 30 positioned as shown. The sensor 30 is mounted about 14 to 18 inches about the ground and positioned within the frame 130 so as to deflect its sensor field 32 upward from horizontal by about 30 degrees plus or minus about 10 degrees. More preferably, the sensor 30 is mounted about 16 inches above the ground and positioned within the frame so as to deflect its signal upward from horizontal by about 30 degrees plus or minus about 5 degrees. This angle allows the sensor 30 to target the torso area 170 of the athlete 172 and thereby prevent inadvertent sensor triggers caused by the athlete's legs passing by the sensor.

Figure 10E:
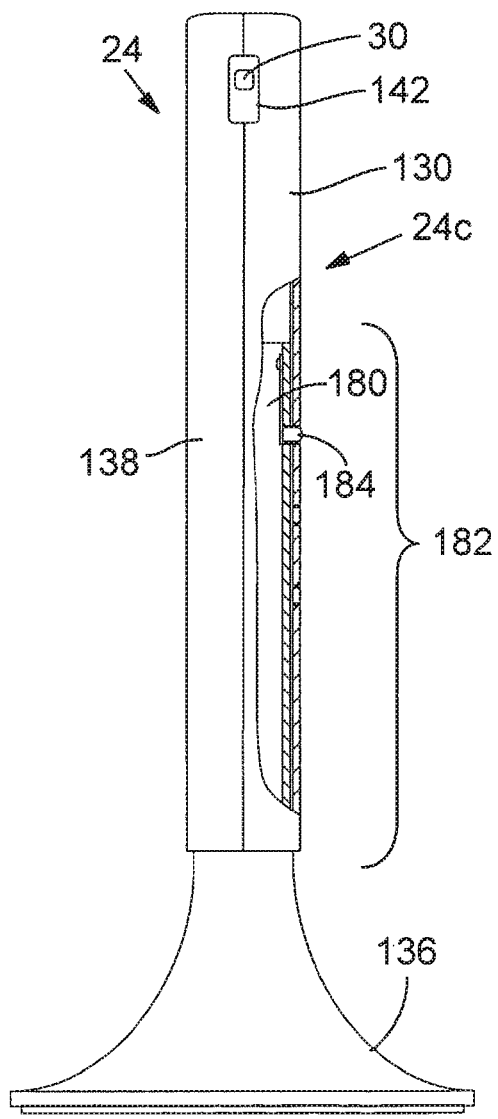
FIG. 10E is a front view of a third preferred sensor unit in accordance with an embodiment of the present invention.

Referring to FIG. 10E, a possible structure for adjusting the height of the sensor 30 relative to the base portion 136 is disclosed. The base portion 136 includes a shaft 180 extending upward therefrom. The tower portion 138 is substantially hollow and slidably engages the shaft 180 of the base portion 136 to allow the tower portion 138 to telescope upward therefrom. A plurality of vertically aligned spaced apart holes 182 extend along the side of the tower portion 138, and a retractable peg 184 that is preferably biased to an extended position extends from the side of the shaft to operably engage one of the holes in the tower portion, thereby holding the tower portion 138 at a desired, user-selected, height.

Referring to FIGS. 15 and 16, a sensor unit 24d having a sensor 30 mounted thereto so as to be both vertically pivotable and horizontally pivotable is disclosed. The tower portion 138 preferably includes an opening 190 for pivotally receiving a sensor-mounting bracket 192 thereto, thereby defining a vertical pivot axis 194. The sensor 30 is operably received within a sensor mount 195, which is pivotally secured to the sensor-mounting bracket 194 as shown to define a substantially horizontal pivot axis 138. It can be appreciated that the two pivots axes 194, 196 allow the sensor 30 to be aimed in any desirable position as needed for a particular use.

Referring to FIG. 14, a sensor unit 24' can also consist of a mat 200 in communication with the base unit 22. The mat 200 can activate a timer based on the detected position of an athlete thereon. One structure for detecting whether an athlete is on the mat 200 includes a contact switch positioned between the surface of the mat and an internal surface of the mat. Accordingly, when pressure is applied to the mat, such as when it is being stood on by an athlete, the contact switch 202 is engaged thereby indicating the start or stop of a timing element in the base unit 22 via a wireless 204 or wired connection thereto.

4. Base Unit Embodiments

Referring to FIGS. 11A to 12C exemplary base unit embodiments 22' (FIGS. 11A to 11C) and 22" (FIGS. 12A-12C) having the previously described base unit 22 components therein are disclosed. Preferably, these base units 22', 22" are small, hand-held devices that include a screen 52 for reading data derived from the sensor units, and a plurality of input buttons 50 for initiating user commands.

Figure 8A:
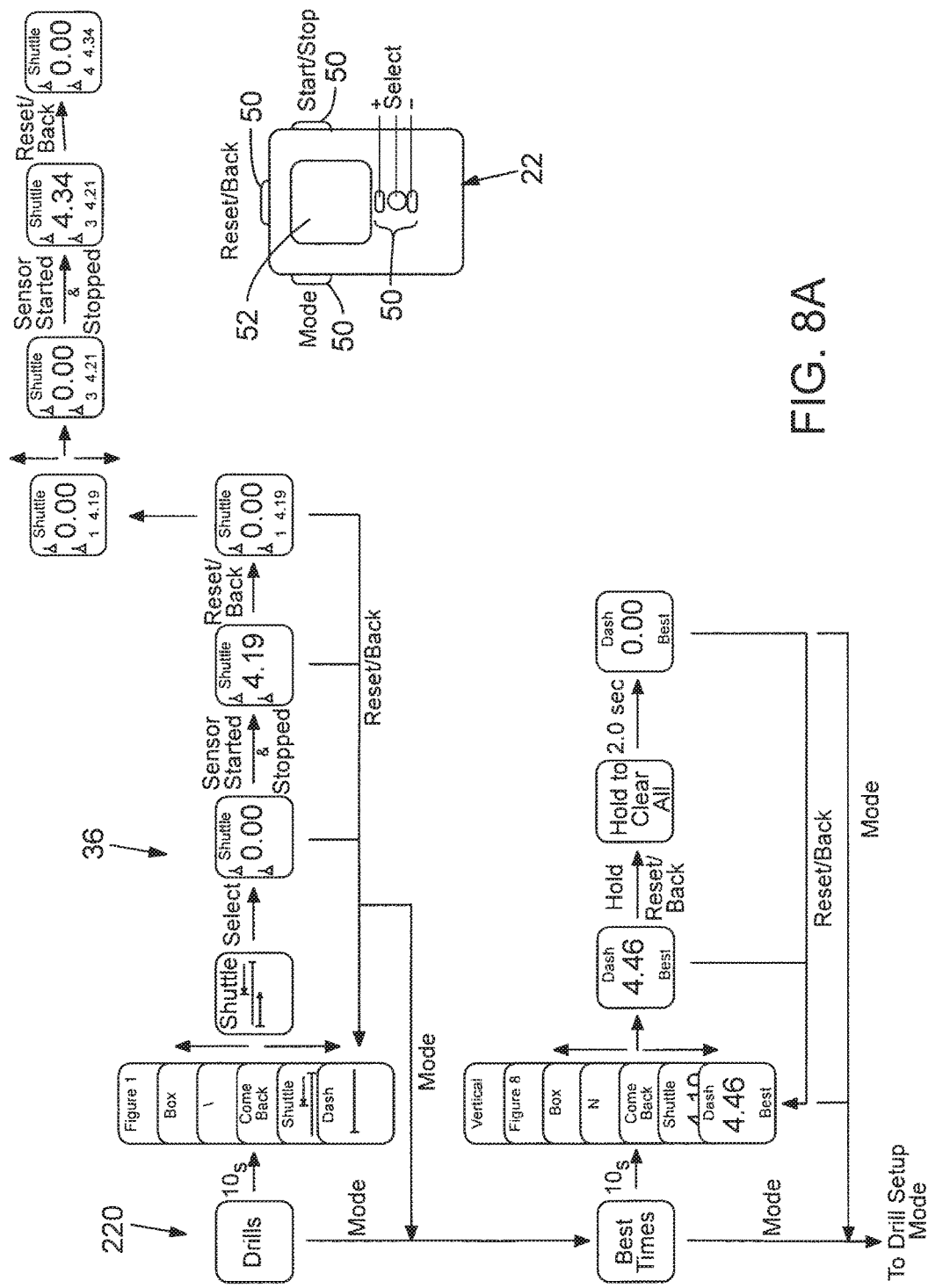
FIG. 8A is a schematic view of a possible user interface of the base unit of FIG. 1.
Figure 8B:
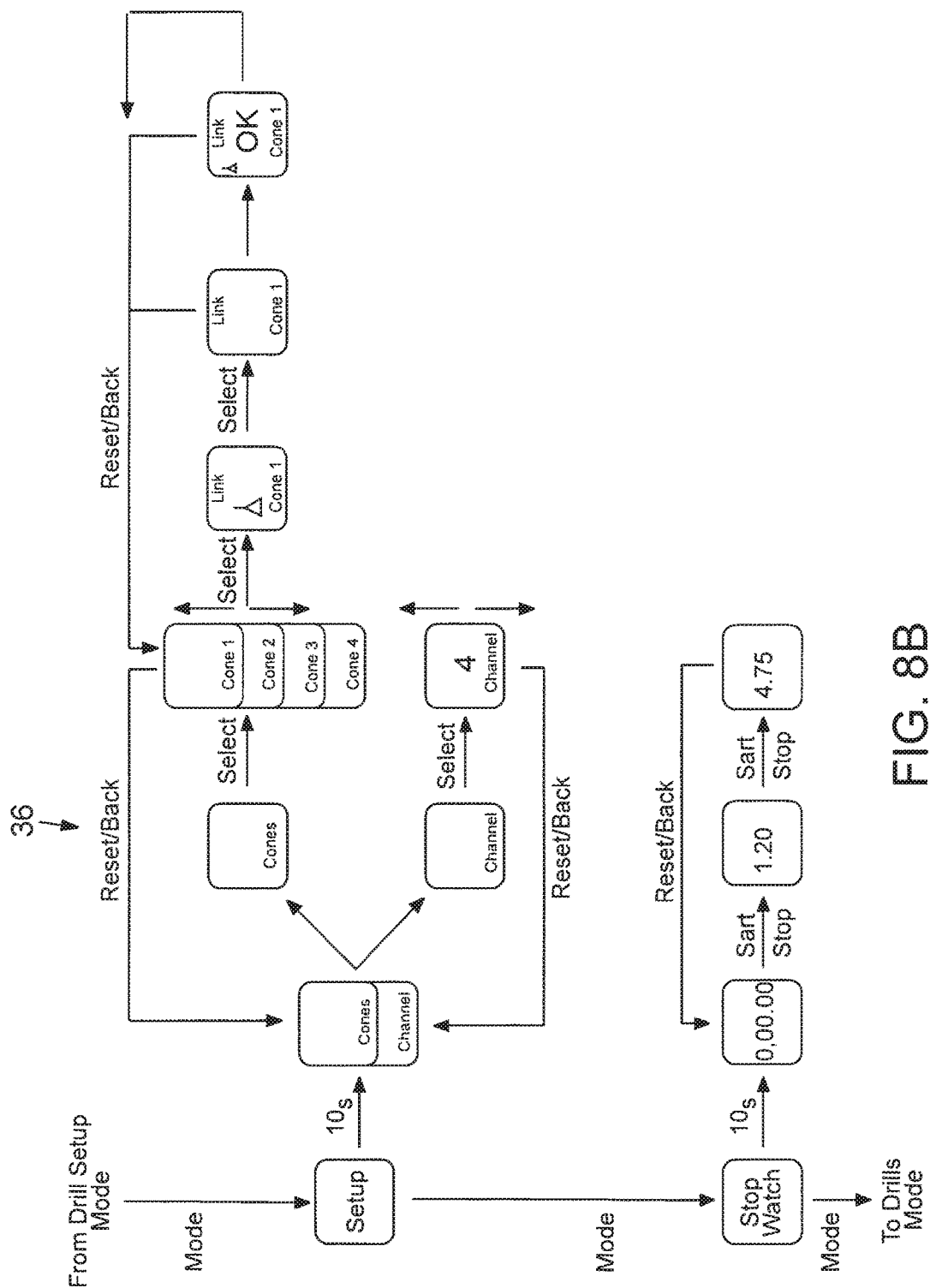
FIG. 8B is a continuation of the schematic View of FIG. 8A.

Referring to FIGS. 8A and 8B, the base unit 22 preferably includes internal software for displaying a logical and easy to use user interface that allows easy use of the system and easy retrieval of the data collected by the system. For example, the user interface 36 can include a first menu 220 that allows the user to select from pre-selected athletic performance drills, view the best times previously recorded for a particular drill, set-up a new drill, or simply have the base unit serve as a stop watch. Preferably, the user interface includes numerous pre-established drill profiles therein to facilitate use of the device.

More preferably, the drills making up one or more of the previously described athleticism rating system are preprogrammed into the base unit, and the results from each drill for a given athlete are used to determine, record and display the athleticism rating of one or more athletes identified in the system.

5. Operation of the Sensor Unit(s) with the Base Unit

Figure 7A:
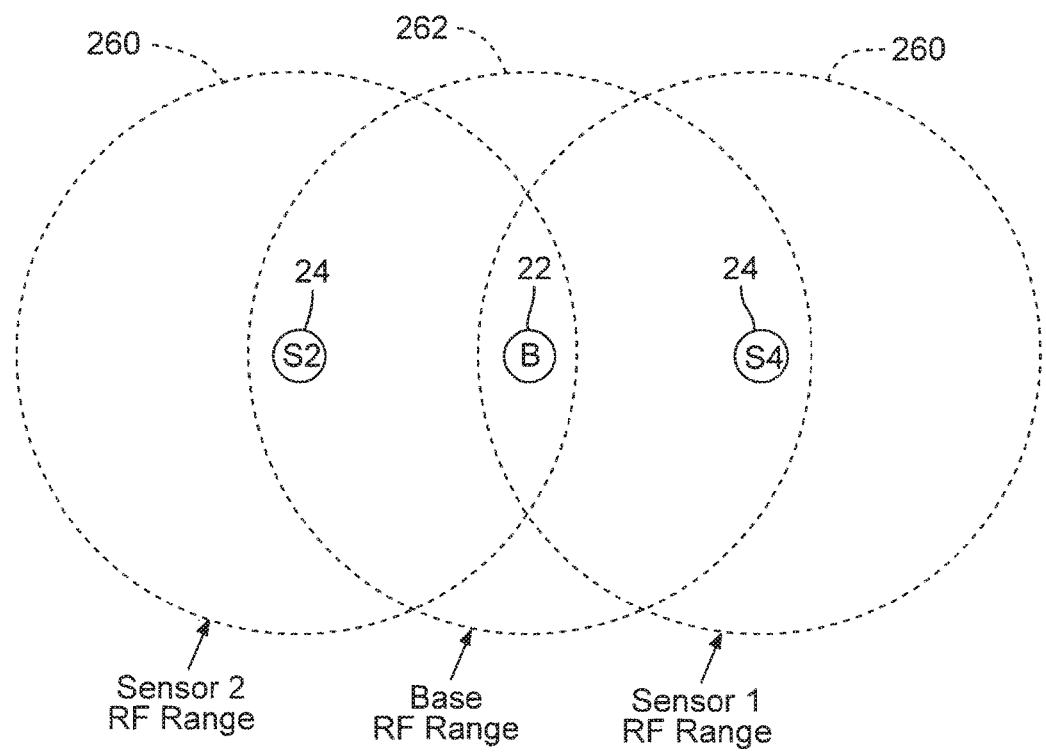
FIG. 7A is a top view of a possible orientation between a plurality of sensor units relative to a base unit in accordance with an embodiment of the present invention.
Figure 7B:
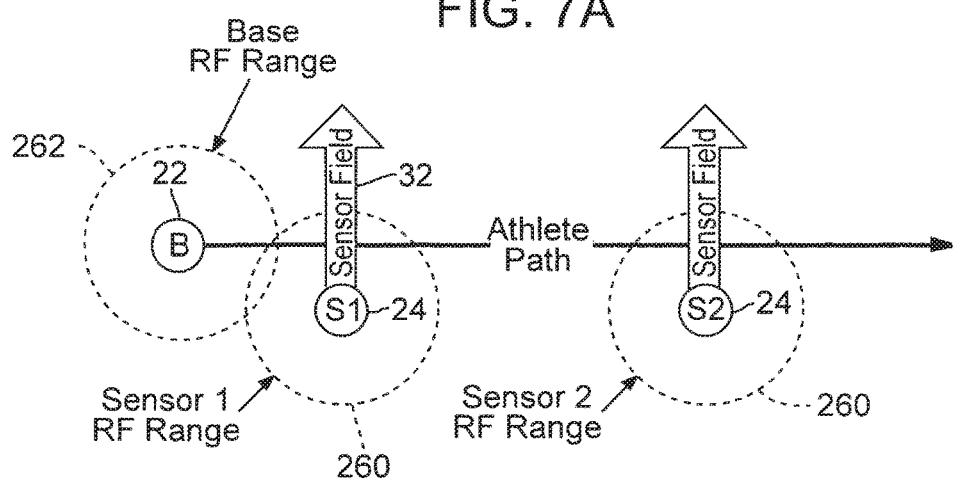
FIG. 7B is a top view of a possible orientation between a plurality of sensor units relative to a base unit in accordance with an embodiment of the present invention.

In general, each sensor unit 24 transmits its collected data within a defined range 260 (FIGS. 6A, 7A, and 7B). The base unit 22 is positioned within this defined range to allow the collected data transmitted by the sensor unit 24 to be received by the base unit 22.

It is important that the sensor unit(s) 24 trigger effectively, and that the communication between the sensor unit(s) 24 and the base unit 22 be effective, clear, and accurate for optimal performance of the system. Accordingly, for optimal performance, the system is preferably configured with the following performance optimization features:

a. Automatic/Programmable Sensor Calibration

Because of the variety in training locations, training drills, and other factors, timing sensors must be able to operate under a wide range of conditions. For example, in the case were a distance sensor 30 is used, the sensor 30 may be located close to a stationary object (i.e. a wall or sign) that is in the detection range for the sensor. As a result, these devices need to be able to adjust their sensing properties dynamically.

This adjustment can be accomplished in many different ways. If desired, the sensor unit 24 could be configured to automatically run such a calibration when first activated. However, such a feature necessarily increases the complexity and processing requirements of each sensor unit 24.

Additionally, someone moving the sensor unit's location and/or moving any objects that may be located within the sensor's field could impede the sensor unit's automatic calibration. Accordingly, the base unit 22 preferably controls sensor 30 calibration. The calibration is preferably automatic when a drill is selected in the base unit 22. Alternatively, such calibration can be manually selected by the user or dynamically established based on the detected sensor reading. Also, each sensor unit 24 could have a predetermined selection of sensitivity settings such as "low," "medium" and "high" ranges.

b. Time Synchronization Between Sensor Unit(s) and the Base Unit

In cases where the performance measuring system 20 is used as a timing device 20', it is important that timing errors and differences between the different units of the system be minimized. Synchronizing the different units can be complicated by several factors in the system. However, if the devices function in such a manner that the timing delays in the system are consistent, then the length of the actual timing delays is not important. The reason for this is that all the timing information determined by the system, is calculated based on relative timing data.

Figure 5A:
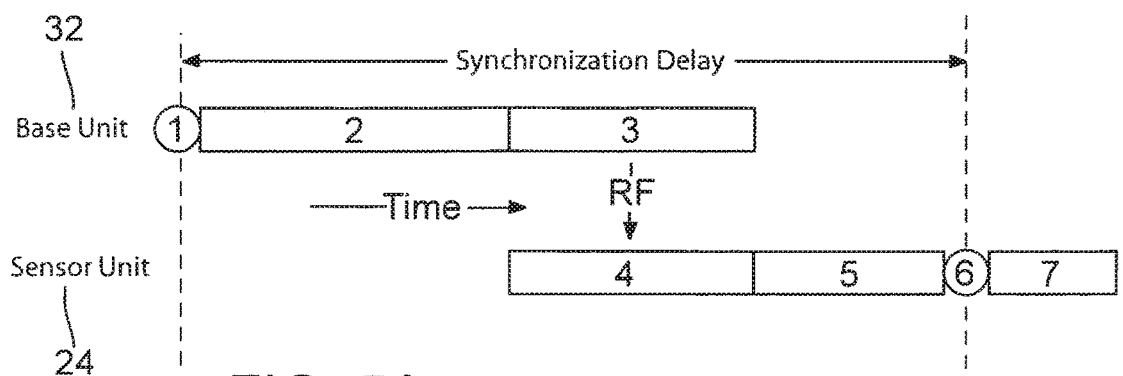
FIG. 5A is a schematic view of a possible communication between a base unit and a sensor unit in accordance with an embodiment of the present invention showing a possible data transmittal timing sequence.
Figure 5B:
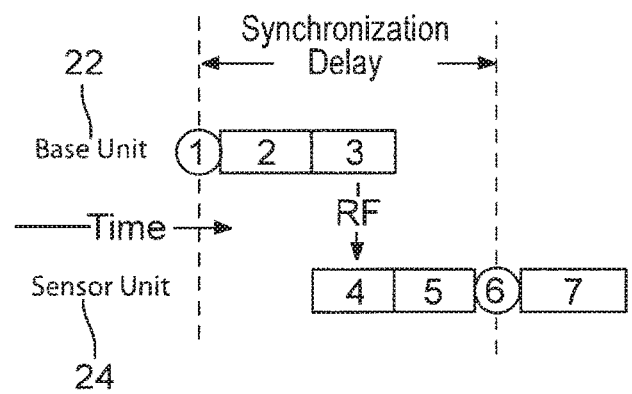
FIG. 5B is a schematic view of an alternative possible communication system between the base unit and sensor unit of FIG. 5A.

In FIGS. 5A and 5B, two timing synchronization cases are diagrammed. These indicate the general sequence involved to send a synchronization message from the base unit 22 to one of the sensor units 24. In both cases, like numbered events indicate like events or actions that is taken by the respective units 22, 24. The horizontal scale represents the passage of time and is the same for both diagrams. The circular items indicate events on the indicated units (either base unit 22 or sensor unit 24) and the rectangular boxes indicate actions that occur on the indicated device. These are defined as follows:

| Event | Description |
|---|---|
| 1 | The base unit 22 records its current time value to use for synchronization |
| 2 | The base unit 22 prepares the message to be transmitted to the sensor unit |
| 3 | The base unit 22 transfers the message on the communication link |
| 4 | The sensor unit 24 hardware receives the message from the base unit |
| 5 | The sensor unit 24 processor responds to the message that was received |
| 6 | The sensor unit 24 time is recorded |
| 7 | The sensor unit 24 processes the synchronization message and synchronizes the local time (from time 6) to the base unit time (base time from time 1). |

There is some delay below time 1 being measured on the base unit 22 and time 6 being measured on the sensor unit 24. If this time is small (relative to the time accuracy requirement) it can be safely ignored in the system. If this time is predictable, it can be accounted for in the time synchronization. However, in a low power RF communication system, it may be the case that neither of these are true or that the delay value is difficult to compute accurately. The result is that the time values may not be synchronized accurately.

However, in the disclosed preferred system, if this synchronization delay is consistent between the base unit 22 and each of the different sensor units 24, then knowing the amount of this time delay is not important. The reason is that all timing values are made on a relative time basis. Since all the time values in the system are computed as differences in the time values and every sensor unit 24 will have a consistent delay incorporated in the time value, this difference is cancelled out in the subtraction. Note that this is different a case where a single sensor 30 is responsible for maintaining the "master" time of the system (therefore not building in the time offset value) and differencing with other sensors in the system.

c. Accurate Time Reporting

Because of potential unreliable characteristics of RF communications, data that is transferred from one sensor unit 24 may not be consistently received by the base unit 22. As a result, the communication protocol used in the system provides support to handle extended periods of such communication dropouts. To support this functionality, the following steps are taken.

i. When a sensor unit 24 reports the, time of a trigger event to the base unit 22, the time of the event (synchronized to the base unit clock) is transmitted to the base unit 22. This eliminates any requirement to synchronize the RF communications with the timing of trigger events;

ii. The sensor keeps a small history of trigger events that it has detected. The base unit 22 can then query for either the time of the last trigger that was observed or the time of specific previous trigger events. This provides support for situations where the communication link may be interrupted for a substantial length of time and then restored; and, iii. A sensor unit 24 can apply a synchronization time offset for trigger events that have already occurred. This provides support to determine accurate timing information in cases where the time synchronization was not established before a trigger event occurred.

d. Optimized RF Network Architectures

For an automated training timing system, there are several different possibilities as to how the communication network from the sensor units 24 to the base unit 22 is designed. In some cases, the athlete will be training with a coach present and only the coach requires the data. In other situations, the athlete is training solo. Additionally, there may be instances where both the athlete and the coach are interested in the current timing information. Each of these presents unique considerations to the network architecture.

Case 1—Coach Display Usage

When a coach is handling the base unit 22, this unit must be in the RF range of all the sensor devices simultaneously. This results from the fact that the base unit will not, in general, be moving between the different sensor devices in the system as it is operating. In order to handle this situation, the RF range 262 for the base unit must reach all the sensors for the system. Note that this does not mean that the sensor units must be able to communicate with each other. This situation is shown in FIG. 7A (B=Base Unit, S1=Sensor Unit 1, S2=Sensor Unit 2). In this layout, the base unit is always able to communicate with each of the sensor nodes.

The setup of the training drills will vary widely and likely span a fairly sizeable distance in some situations. To handle this variability, the system needs to support an RF range that is sufficiently large to reach all the sensors. As this range grows, the wireless components must increase their transmitted power levels. In order to operate at these elevated levels, maintaining compliance with the regulatory RF emission constraints significantly increases the complexity of the operation of the RF subsystem. For operation in unlicensed frequency bands, this involves the use of some form of spread spectrum technique such as frequency hopping. Implementing this capability in the RF components significantly increases the complexity of the system, but the power and flexibility of this system architecture can justify this extra complexity.

Case 2—Athlete Display Usage

When an athlete is using the system alone, he or she will generally want the base unit attached to his or her body. Ideally, this could be in a suitable form factor such as a wrist mounted watch or the like. In this configuration, the system can function the same way it does in the first case. However, the added complexity of the RF link and the increase in power usage may be undesirable to support in this situation. Since that athlete will be physically close to the sensor units when the sensor measurements are made, the power of the RF transmissions could be significantly reduced. This would both reduce the system power requirements and reduce the transmitted RF power levels to the state where a simpler RF implementation is possible. This situation is shown in FIG. 7B using the same element names and numbers as in the previous discussion of FIG. 7A.

The key to this system is that the base unit 24 is located physically close to a sensor unit 24 when a sensor measurement is to being made. The sensor unit 24 still handles the measurement and this information is then transferred to the base unit attached to the athlete. From a network perspective, the communications to handle this functionality can be handled by any of several different methods.

Case 3—Coach and Athlete Display Usage

In order for both the athlete and the coach to track the timing information, there are several possible implementations. In one implementation, the same architecture as for case 1 to communicate between the coach unit and the sensor units could be used. The coach unit could then resend, possibly with a different protocol or with a different RF frequency band, the performance data to the athlete unit for display. Likely the RF performance of the wearable device would only support a simple protocol, operate with a short range, and need to be near the base unit in order to operate successfully. This situation is shown in FIG. 6A using the same element names and numbers as in the previous discussion of FIG. 7A.

In this case, the base unit 22 is actually operating two RF communication links. The first link is used to communicate with the sensor units much the same way as described in case 1. This link would be implemented for longer-range operation. The second link is implemented to communicate with the athlete's unit. This communication would likely be much simpler and shorter range. When the system operates, the base unit interacts with the different sensors and handles the performance timing. Simultaneously, the base unit can operate the second RF link to communicate with the athlete's units. This allows the performance results to be displayed on the athlete's unit without requiring his or her to stop his or her training and check the base unit. This additional RF link may be required if a specific athlete's unit is employed which implements a specific RF link.

Another implementation may allow the athlete unit to monitor the RF as it is reported by the coach unit and interpret this information directly. This method could work, but it would be more complex for the athlete unit to determine the meaning of the trigger times being reported. Additionally, the athlete unit would need to employ the same RF communication scheme as is used by the base and sensor units, which may not be optimal or possible.

e. Optimized Start/Stop Processing

In the past, athletic event timing is started when an audio or visual start queue is provided. However, in a training situation, this isn't the best solution in many cases. Ideally the present system is set up to start the training times when the sensor is triggered. In other words, the timing clock is only started after an athlete triggers a sensor. This allows the system to be very flexible in the way events are timed. Additionally it removes the requirement to have a separate starting trigger that the athlete must use to get accurate timing information. The result is a more flexible system for a training environment.

For this discussion, we use the following terms:

| Term | Meaning |
| --- | --- |
| Trigger | The sensor state is changed between active and inactive. In some cases, we will know the actual state. In other case, we may only know that the state changed. |
| Active | The sensor is detecting the presence of a user |
| Inactive | The sensor is not detecting the presence of a user |
| Enter | The trigger where the sensor switches from Inactive to Active |
| Exit | The trigger where the sensor switches from Active to Inactive |
| Local Trigger Time | Time value associated with a Trigger event based on the local time value. |
| Synched Trigger Time | Time value associated with a Trigger event adjusted to the time base of the base unit. | i. Enter/Exit Start Processing

Another unique issue of a training environment is the way that drills are started. Since these activities are not currently being timed, the methods and techniques for them are widely varied. This presents an issue when automated timers are used for the drills. The biggest issue is related to handling of starting triggers.

There are two different cases that need to be handled in this situation. In the first case, the user starts behind the sensor and triggers the sensor after the athlete starts the drill when passing by it. However, in many cases, the starting procedure/positioning is different and the athlete is stationary in the sensor field for a period of time before leaving it. In order to address this issue, the sensor needs to execute additional processing to determine the actual trigger time.

The preferred approach is to detect the amount of time the user "dwells" with the sensor in the active state at the start of the drill. If the user is crossing the field of the starting sensor, then the sensor will only be in the active state for a short period. In this case, the sensor should report the time of the Enter trigger as an event time. If the user stays in the sensor field before they start the drill, then the sensor is in the active state for a much longer period. In this situation, the sensor should report the time of the Exit trigger as an event time. To address this need, the sensor preferably has a dwell time threshold. The amount of time the user spends in the sensor field can then be used to determine which value is used.

Figure 2:
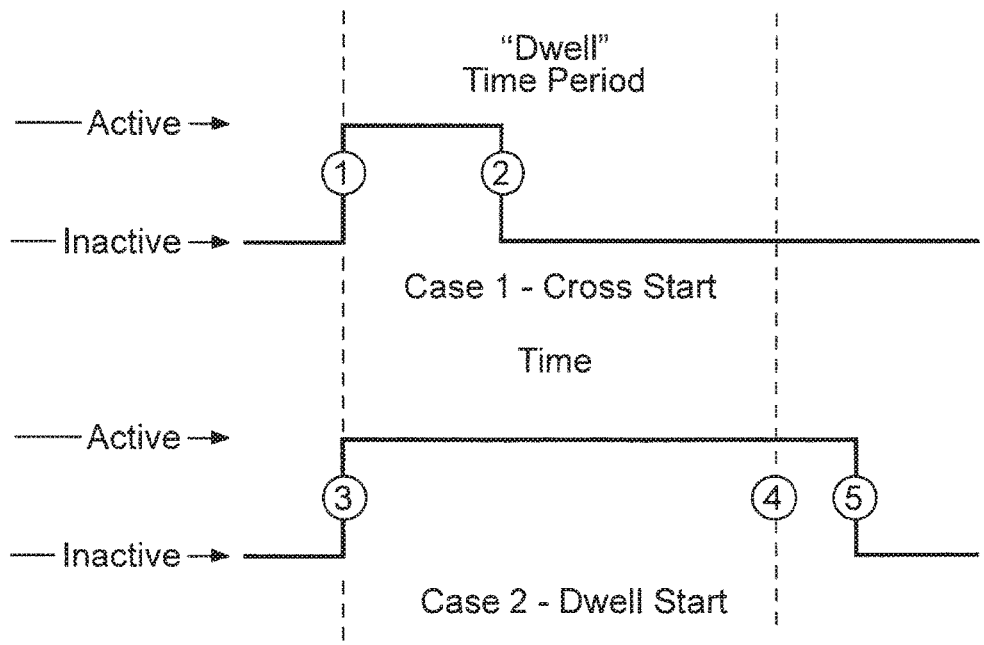
FIG. 2 is a schematic diagram showing the preferred state of the processed sensor input for a cross start and a dwell start in accordance with embodiments of the present invention.

FIG. 2 presents a diagram that indicates the preferred state of the processed sensor input for the two cases described above. The numbered points on the diagram indicate the time specific events that are processed by the sensor unit. Each event is discussed below for both cases.

Case 1—"Cross" Start

Event 1—The sensor processor recognizes an enter trigger event for the start. At this point, the type of starting sequence being executed has not been determined. Therefore, the current time value is stored in the device, but the device does not report a trigger when it communicates with the base unit.

Event 2—The sensor processor recognizes an exit event occurred. In this case, the duration of time the sensor was in the active state is less than the value for a dwell time. Therefore, the sensor reports to the base unit that a trigger has occurred and reports the trigger event time as the time stored from event 1 (the enter event).

Case 2—"Dwell" Start

Event 3—The sensor processor recognizes an enter trigger event for the start. Again, the type of starting sequence has not been determined so this time value is stored and no event trigger is reported.

Event 4—At this point, the sensor processor determines that the dwell time for this starting event has been exceeded. This indicates that the start is a dwell start sequence and that the exit trigger event time should be used for this triggering.

Event 5—The sensor processor now sees an exit trigger event occur. At this point, the current time is recorded as the trigger event time and reported to the base unit.

Since the athlete will only be stationary during the start of a specific training test, this processing is usually limited to the timing of starting events. Other trigger events during a timing sequence are preferably triggered on the entering trigger time.

The dwell time can be adjustable. The adjustment can be exposed to and made from the base unit or, if applicable, a host system attached to the base unit). Also, if the base unit supports different drill types in the user interface, each type may have an associated dwell time for the starting procedure.

ii. Multiple Event Triggering

Figure 4A:
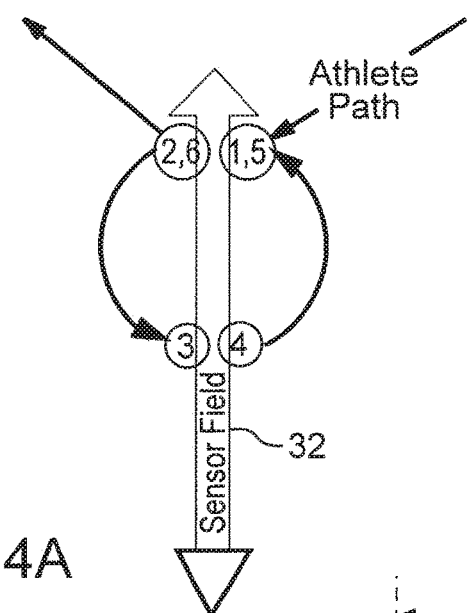
FIG. 4A is a top view of an alternative possible athlete path relative to a sensor field generated by a sensor unit of FIG. 1 showing possible entry points (1) (3) (5) and exit points (2) (4) (6) of the athlete through the sensor field.
Figure 4B:
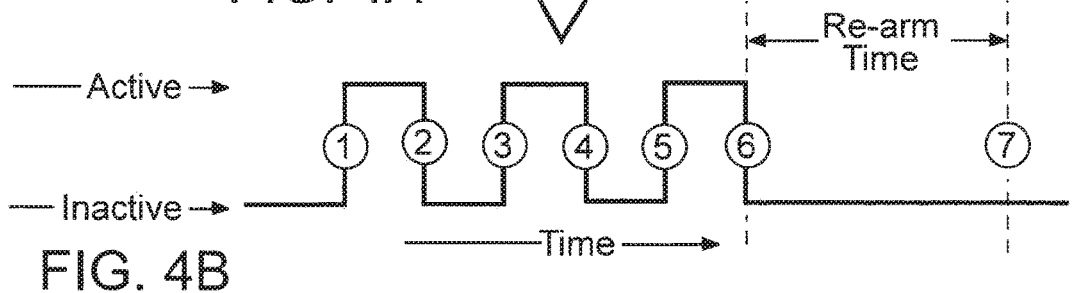
FIG. 4B is an exemplar timing sequence in response to the sensor filed detection at points (1) through (6) implementing a re-arm time in accordance with an embodiment of the present invention.

Referring to FIGS. 4A & 4B, another timing consideration for training applications involves to multiple event triggering of the same sensor. In most cases, as the athlete passes a sensor, the sensor will go in and out of the active state a single time. However, there are some situations where the athlete may pass a sensor and the sensor is triggered in and out of the active state multiple times. This may be a result of the nature of the sensor operation or it may be a result of the design of the specific drill. In these cases, the sensor processor must be able to process the multiple trigger events of the sensor and recognize the false event triggers that should not be reported to the base unit.

This issue arises infrequently for typical timing equipment. Such equipment is typically configured only for detecting a single pass by an athlete. However, such typical equipment is useless in a training environment, where timing devices will be called on in some training drills and the like to detect and trigger several times during one training drill. Accordingly, the present invention preferably includes the capability to perform additional processing to accommodate for this potential use.

Preferably, this additional processing includes using a "re-arm" time for the sensor. After a sensor has been triggered by an enter event, the sensor is required to return to the inactive state continuously for some minimum period of time before the next enter trigger event is detected. This period is large enough to prevent the multiple triggers from a single interaction. However, the value is limited by the fact that the same sensor may be triggered multiple times in the same training drill. FIGS. 3A, 3B, 4A and 4B illustrate the way that this value is used.

Figure 3A:
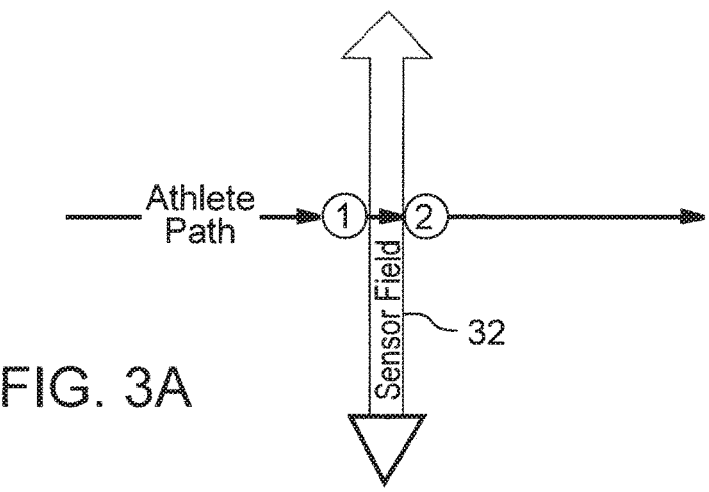
FIG. 3A is a top view of an exemplar athlete path relative to a sensor field generated by the athleticism performance measuring system of FIG. 1 showing a possible entry point (1) and exit point (2) through the sensor field.
Figure 3B:
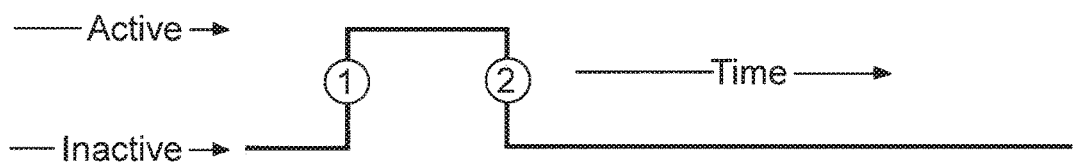
FIG. 3B is an exemplar timing sequence in response to the sensor field detection at points (1) and (2) of FIG. 3A.

In FIGS. 3A & 3B, a simple sensor-crossing situation is displayed. The athlete passes by the sensor a single time. In this case, the sensor enters the active state at time 1 and returns to the inactive state at time 2. This situation is very straightforward and similar to the operation of a typical timing system.

In FIGS. 4A and 4B, the situation is slightly more complicated. In this case, the athlete is rounding a cone for a training drill and actually can enter and leave the range of the sensor three different times. At time 1, the sensor is triggered to the active state for the first time. Then, at time 2, the sensor returns to the inactive state. At time 3, the sensor status returns to the active state. The sensor has observed up to 3 different potential trigger events for what is effectively a single crossing stage in the drill. In order to make the sensor ignore the extraneous trigger events, the device requires the sensor to be in the inactive state for a minimum amount of time before it will detect the next trigger.

In FIG. 4B, the duration of the rearming time is shown between time 6 and time 7. As shown, the time duration between time 2 and 3 as well as time 4 and 5 does not exceed the rearming time value. In these cases, the sensor would then ignore the trigger events at time 3 and 5 as being valid trigger events. At time 7, the device would recognize that the rearm time has expired and will then accept the next enter trigger as a trigger.

The rearming time value can have a default value. Additionally, this value can be modified by the base unit. Also, the value for the rearming time may be dependent on the drill selected on the base unit.

It is important to note this processing does not affect the triggering for the simple pass by case of FIGS. 3A & 3B.

6. Exemplar Drills Using the Performance Measuring System

Figure 17A:
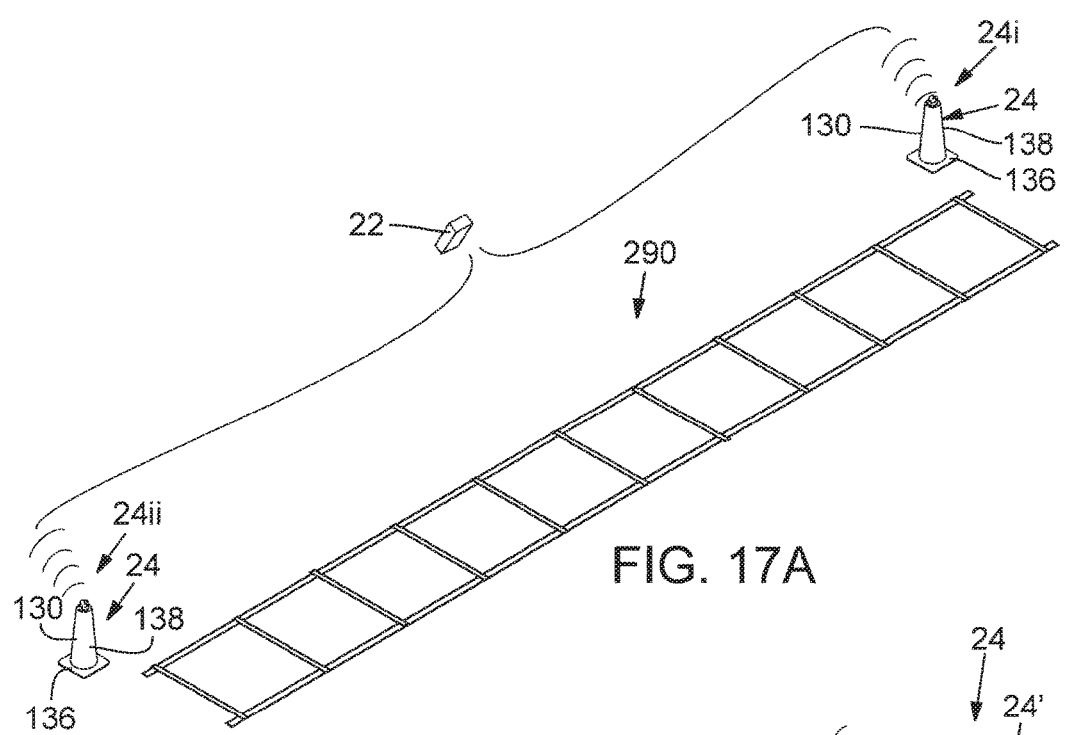
FIG. 17A is an isometric view of a first exemplar training drill using the athleticism performance measuring system of FIG. 1 showing use of two sensor units of FIG. 14 in communication with a base unit.
Figure 17B:
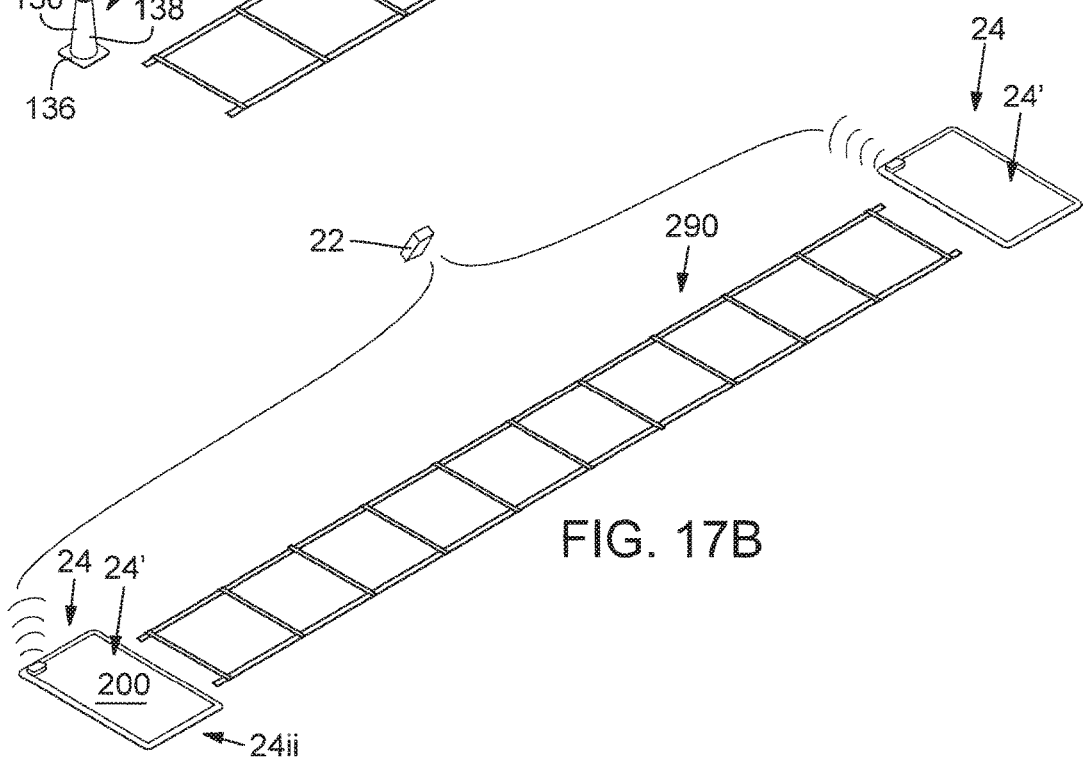
FIG. 17B is an isometric view of a second exemplar training drill using the athleticism performance measuring system of FIG. 1 showing use of two sensor units of FIG. 14 in communication with a base unit.

Exemplar athletic training drills using performance measuring systems of the present invention are shown in FIGS. 17A to 19B. In FIGS. 17A & 17B, sensor units 24 are placed at the beginning and end of a latter-type drill 290. Each sensor unit 24 is in communication with the base unit 22. When an athlete passes the first sensor unit 24i, a timer is initiated. When the athlete passes the second sensor unit 24, the timer is automatically stopped and the time for the athlete to complete the drill is recorded and displayed by the base unit 22.

FIGS. 19A and 19B show a similar drill with hurdles 292 using sensor units at the beginning and end of the course to start and stop the timer on the base unit.

Figure 18A:
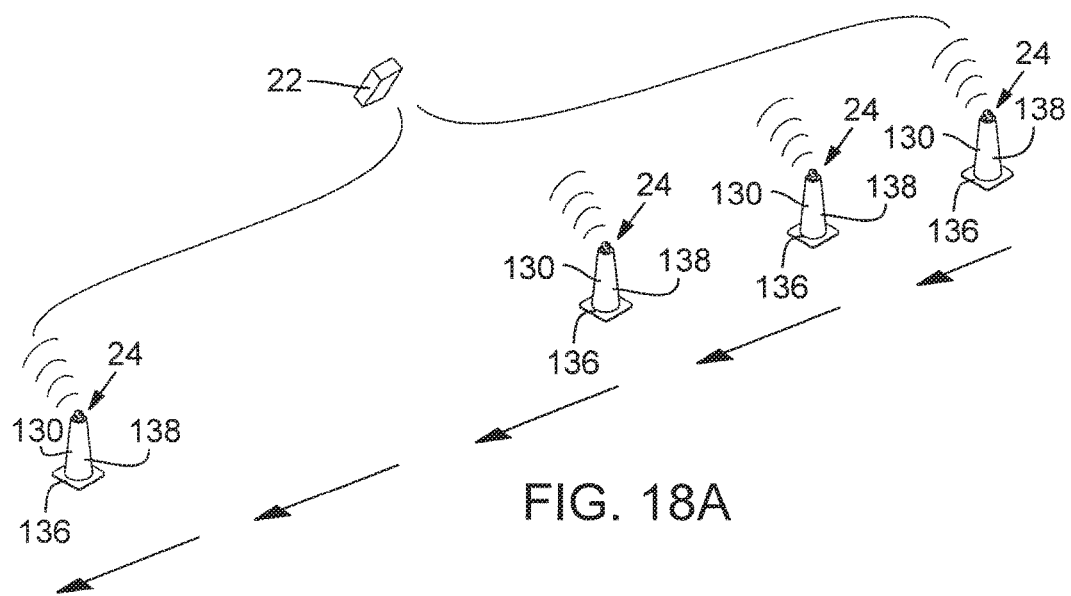
FIG. 18A is an isometric view of a third exemplar training drill using the athleticism performance measuring system of FIG. 1 showing use of four sensor units of FIG. 14 along a athlete path, each sensor unit in communication with a base unit.
Figure 18B:
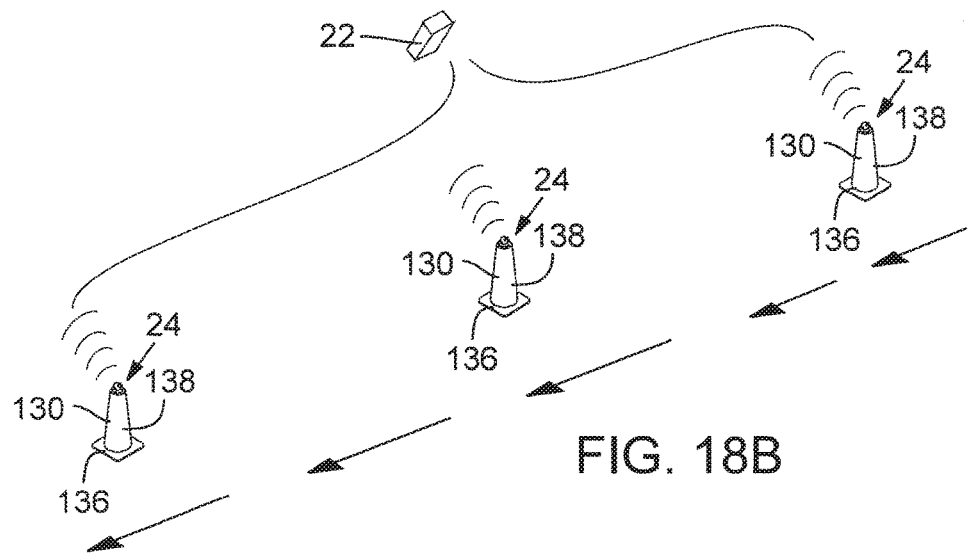
FIG. 18B is an isometric view of a fourth exemplar training drill using the athleticism performance measuring system of FIG. 1 showing use of three sensor units of FIG. 14 along a athlete path, each sensor unit in communication with a base unit.

FIGS. 18A and 18B show that one or more sensor units 24 can be placed along the path of a particular drill, thereby allowing split times along the path to be automatically detected by the base unit 22.

It can be appreciated that in cases where a plurality of sensor units 24 are used with a common base unit 22, any combination of the disclosed sensor units (24a-d, 24') could be used. For example, a drill could be set up that uses both a mat sensor unit 24' and a tower sensor unit 24a-d.

7. Alternative Uses/Extensions

Having described and illustrated the principles of our invention with reference to a preferred embodiment thereof, it will be apparent that the invention can be modified in arrangement and detail without departing from such principles. For example, while a large portion of this disclosure discusses the performance measuring system 20 as being a timing-related system 20', it need not be limited to timing systems. It is possible to use the distributed architecture to measure and evaluate other performance metrics. For instance, the sensor 30 may provide data related to the contact force of an athlete's step. Another sensor would provide data about the height of an athlete's vertical jumping ability. In each case, the important element is that the base unit and reporting capability are separate from the sensor units 24 that are used. This architecture supports a great deal of flexibility. Similarly, the same base unit could be made to work with several different sensors. Moreover, as sensor technology evolves, any improved sensors could be incorporated into the design as needed and/or retrofit into existing products without forcing a consumer to buy an entirely new system.

Accordingly, in view of the many possible embodiments to which the principles may be put, it should be recognized that the detailed embodiments are illustrative only and should not be taken as limiting the scope of our invention. Accordingly, we claim as our invention all such modifications as may come within the scope and spirit of the following claims and equivalents thereto.

We claim:

1. A method of processing athletic sensor data comprising:

receiving through a first wireless communication link of a first portable base unit, performance data of a first athlete collected by at least one sensor during the first athlete's performance of an athletic activity during a first time frame, wherein the receiving is conducted during at least a portion of the first time frame;

processing the performance data of the first athlete at the first base unit by seamlessly integrating the collected performance data into an automatically calculated athletic performance score for the first athlete for the performance of the athletic activity utilizing performance data received from the at least one sensor collected during the first time frame of the athletic performance;

receiving through a first wireless communication link of a second portable base unit, performance data of a second athlete collected by at least one sensor during the second athlete's performance of the athletic activity during a second time frame, wherein the receiving is conducted during at least a portion of the second time frame;

processing the performance data of the second athlete at the second base unit by seamlessly integrating the collected performance data into an automatically calculated athletic performance score for the second athlete for the performance of the athletic activity utilizing performance data received from the at least one sensor collected during the second time frame of the athletic performance;

automatically applying performance data from the first time frame and the second time frame to a sport-specific athleticism rating equation to generate a sport-specific performance score for each of the first athlete and the second athlete;

receiving performance data from a third athlete during performance of a sport-specific activity during a third time frame, and in response, processing the performance scores of the first athlete and the second athlete to determine which of the first and the second athlete should replace the third athlete in the sport-specific activity; and outputting a determination of a selection of either the first athlete or the second athlete to replace the third athlete in the sport-specific activity occurring during the third time frame.

2. The method of claim 1, wherein the first time frame and the second time frame overlap.

3. The method of claim 1, wherein the first time frame and the second time frame are identical.

4. The method of claim 2, wherein the athletic activity is a team sport activity involving at least the first athlete, the second athlete, and a third athlete.

5. The method of claim 1, wherein the athletic activity is a sport-specific training drill having required movements for the athlete that are rationally related to the skills needed for that particular sport.

6. The method of claim 1, wherein the at least one sensor is located on an appendage-worn device.

7. The method of claim 1, wherein the first athlete and the second athlete are each performing the same sport-specific activity that is selected from the group consisting of: football, soccer, running, jogging, yoga, walking, and combinations thereof.

8. The method of claim 1, wherein the at least one sensor of the first portable base unit is a timing sensor and receiving performance data comprises:
automatically detecting a plurality of triggering events from the timing sensor during the first athlete's performance of a first test.

9. The method of claim 8, wherein calculating the sport-specific score comprises:
determining that the athlete's movements constitute actions of a sport-specific activity, and as a result, determining that the user in engaged in the sport-specific activity.

10. A sensor system configured to process athletic sensor data comprising:
a first base unit comprising:
a processor;
a receiver configured to automatically receive through a first wireless communication link, performance data collected by one or more athletic units, each athletic unit being configured to be worn by an athlete during a first athletic event and comprising a sensor;
a transmitter configured to automatically wirelessly transmit through a second wireless communication link the received performance data to a server; and
a non-transitory computer-readable medium comprising computer-executable instructions that when executed by the processor perform at least:
receiving an electronic signal identifying an initiation of a sport-specific activity for at least a first athlete;
processing the performance data collected during the sport-specific activity to seamlessly integrate the collected performance data from the sport-specific activity into an automatically-calculated normalized athletic equation to obtain an athletic performance score for the first athlete for the sport-specific activity utilizing performance data received from at least one of the one or more sensors and outputting the first athlete's athletic performance score;
after calculation of the first athletic score, receiving performance data from a second athlete's performance of an athletic event that is sport-specific to the same sport as the sport-specific activity, and in response, processing the performance data from the second athlete into the automatically-calculated normalized athletic equation to obtain an athletic performance score for the second athlete; and
processing the performance scores of the first athlete and the second athlete to output a determination to replace the first athlete with the second athlete for a sport-specific task during the athletic event.

11. The sensor system of claim 10, wherein the first or the second wireless communication link comprises a link to a wireless telephony network.

12. The sensor system of claim 10, wherein the athletic activity is a sport-specific training drill.

13. The system of claim 11, wherein the non-transitory computer-readable medium further comprises computer-executable instructions that when executed by the processor, further perform at least:
displaying performance results obtained from at least a portion of performance data on a display.

14. The sensor system of claim 13, wherein the displaying of the performance results is during the first athletic activity.

15. The sensor system of claim 10, wherein the performance data comprises at least one of contact force data and accelerometer data.

16. The sensor system of claim 10, wherein the athletic event is an activity selected from the group consisting of: a football game, soccer game, basketball game, running event, track meet, yoga session, and combinations thereof.

17. The sensor system of claim 16, wherein at least one sensor of the one or more sensors is a timing sensor and receiving performance data comprises:
automatically detecting a plurality of triggering events from the timing sensor during the first athlete's performance of a first test.

18. The sensor system of claim 17, wherein calculating the athletic performance score for the second athlete comprises:
receiving a user input indicating the initiation of a sport-specific athletic event.

* * * * *